United States Patent [19]
Yamahara et al.

[11] Patent Number: 5,844,649
[45] Date of Patent: Dec. 1, 1998

[54] LIQUID CRYSTAL DISPLAY

[75] Inventors: Motohiro Yamahara, Osaka; Mitsuaki Hirata, Nara; Shigeaki Mizushima, Ikoma; Noriko Watanabe, Nara, all of Japan

[73] Assignee: Sharp Kabushiki Kaisha, Osaka, Japan

[21] Appl. No.: 827,662

[22] Filed: Apr. 10, 1997

[30] Foreign Application Priority Data

Apr. 19, 1996 [JP] Japan ..................................... 8-098781
Dec. 26, 1996 [JP] Japan ..................................... 8-347466

[51] Int. Cl.⁶ ..................... G02F 1/1335; G02F 1/1343; G02F 1/1337
[52] U.S. Cl. .......................... 349/118; 349/144; 349/129
[58] Field of Search .................................. 349/128, 129, 349/118, 144

[56] References Cited

U.S. PATENT DOCUMENTS

| | | | |
|---|---|---|---|
| 5,583,679 | 12/1996 | Ito et al. .................................. | 349/118 |
| 5,646,703 | 7/1997 | Kamada et al. ........................ | 349/118 |
| 5,657,140 | 8/1997 | Xu et al. ................................. | 349/118 |
| 5,666,178 | 9/1997 | Hirata et al. ........................... | 349/136 |
| 5,667,854 | 9/1997 | Yamada .................................. | 349/118 |
| 5,689,322 | 11/1997 | Hirata et al. ........................... | 349/129 |
| 5,699,136 | 12/1997 | Arakawa et al. ...................... | 349/118 |
| 5,710,611 | 1/1998 | Suzuki et al. .......................... | 349/129 |

FOREIGN PATENT DOCUMENTS 6-118406  4/1994  Japan .
6-194645  7/1994  Japan .

Primary Examiner—Hung X. Dang
Assistant Examiner—Tiep H. Nguyen
Attorney, Agent, or Firm—David G. Conlin; William J. Daley, Jr.

[57] ABSTRACT

A liquid crystal display has a liquid crystal layer that is sandwiched between a pair of electrode substrates in a manner so as to contact alignment films, and also has a liquid crystal display element having optical phase-difference plates placed on both sides thereof. The liquid crystal layer is divided into a first division-section and a second division-section that have different sizes and that are oriented by the alignment films in respectively different directions. Further, with respect to the first division-section that has the larger size, an optical phase difference plate is placed so that the index ellipsoid, which identifies the refractive-index anisotropy of the optical phase-difference plate, has an inclined direction to the optical phase-difference plate that is opposite to the pretilt direction of liquid crystal molecules located in the vicinity of the alignment films. Thus, since biased optical characteristics are properly compensated, viewing-angle characteristics in the case of inclined viewing angles can be improved. Consequently, it becomes possible to eliminate the occurrences of a gradation-inverting phenomenon in the up and down directions as well as right and left directions and a coloring phenomenon in the up and down direction, and consequently to improve contrast while eliminating display unevenness.

29 Claims, 25 Drawing Sheets

LIQUID CRYSTAL DISPLAY

FIELD OF THE INVENTION

The present invention relates to a liquid crystal display which has a display screen with an improved viewing-angle characteristic.

BACKGROUND OF THE INVENTION

Liquid crystal displays using nematic liquid-crystal display elements, which have conventionally been widely used as numeric-value-segment-type displays such as watches and portable calculators, have recently been also used in word processors, note-type personal computers, car-use liquid-crystal televisions, and other apparatuses.

Generally, a liquid crystal display element has a light-transmitting substrate and electrode lines for turning on and off pixels and other components that are formed on the substrate. For example, in an active-matrix liquid crystal display, active elements, such as thin-film transistors, are formed on the substrate together with the electrode lines as a switching means for selectively driving pixel electrodes through which voltages are applied to the liquid crystal. Further, in liquid crystal displays capable of color display, color filter layers having colors such as red, green and blue, are provided on the substrate.

With respect to liquid crystal display modes adopted in the above-mentioned liquid crystal display element, different modes are suitably selected depending on twist angles of the liquid crystal. For example, the active-driving-type twisted nematic liquid crystal display mode (hereinafter, referred to as the TN mode) and the multiple-driving-type super-twisted nematic liquid crystal display mode (hereinafter, referred to as the STN mode) have been well known.

The TN mode displays images by orienting the nematic liquid crystal molecules to a 90°-twisted state so as to direct light along the twisted directions. The STN mode utilizes the fact that the transmittance is allowed to change abruptly in the vicinity of the threshold value of the applied voltage to the liquid crystal by expanding the twist angle of the nematic liquid crystal molecules to not less than 90°.

The problem with the STN mode is that the background of the display screen sustains a peculiar color due to interference between colors because of the use of the birefringence effect on liquid crystal. In order to solve this problem and to provide a proper black-and-white display in the STN mode, the application of an optical-retardation compensation plate is considered to be effective. Display modes using the optical-retardation compensation plate are mainly classified into two modes, that is, the double layered super-twisted nematic optical-retardation compensation mode (hereinafter, referred to as the DSTN mode) and the film-type optical-retardation compensation mode (hereinafter, referred to as the film-addition mode) wherein a film having an optical anisotropy is provided.

The DSTN mode uses a two-layered construction that has display-use liquid crystal cells and liquid crystal cells which are oriented with a twist angle in a direction reversed to that of the display-use liquid crystal cells. The film-addition mode uses a construction wherein films having an optical anisotropy are placed. Here, the film-addition mode has been considered to be more prospective on the standpoint of light weight and low costs. Since the application of such an optical-retardation compensation mode makes it possible to improve the black-and-white display characteristic, color STN liquid crystal displays, which enable color display by installing color-filter layers in STN-mode displays, have been achieved.

The TN modes are, on the other hand, classified into the normally black mode and the normally white mode. In the normally black mode, a pair of polarization plates are placed with their polarizing directions in parallel with each other, and a black display is provided in a state where no on-voltage is applied to the liquid crystal layer (off-state). In the normally white mode, a pair of polarization plates are placed with their polarizing directions orthogonal to each other, and a white display is provided in the off-state. Here, the normally white mode is considered to be more prospective from the standpoints of display contrast, color reproducibility, viewing-angle dependence, etc.

In the TN liquid crystal displays, when a voltage is applied across a pair of opposing electrode substrates with liquid crystal molecules being oriented in an inclined manner between the electrode substrates, some liquid crystal molecules located in the vicinity of the electrode substrates do not move while pointing in their pretilt directions, although intermediate liquid crystal molecules in the liquid crystal layer are oriented in the predetermined direction. For this reason, the contrast of displayed images tends to change depending on the viewing angle from which the screen is viewed due to the anisotropy in refractive index (birefringence) of the liquid crystal molecules.

As described above, the problem with the TN liquid crystal displays is that the contrast is greatly dependent on the viewing angle due to the anisotropy in refractive index. In particular, as the viewing angle is gradually inclined from the direction perpendicular to the screen toward a direction providing a better contrast, and when the viewing angle has exceeded a certain angle, the phenomenon occurs in which the gradation of black-and-white display is inverted. In other words, in the TN liquid crystal displays, the viewing angle is asymmetric in respective cases when the viewing angle is inclined upward and when it is inclined downward.

Conventionally, various techniques have been proposed in order to solve such a gradation-inverting phenomenon. For example, Japanese Laid-Open Patent Publication No. 186735/1982 (Tokukaisho 57-186735) has disclosed a so-called pixel-division method wherein: each display pattern (pixel) is divided into a plurality of regions, and orientation control is carried out so that each of the divided regions has an individual viewing-angle characteristic. With this method, since the liquid crystal molecules are allowed to rise in mutually different directions in the respective regions, it is possible to eliminate the viewing-angle dependence.

In addition, Japanese Laid-Open Patent Publication No. 118406/1994 (Tokukaihei 6-118406) and Japanese Laid-Open Patent Publication No. 194645/1994 (Tokukaihei 6-194645) have disclosed a method wherein an optical phase-difference plate is combined with the pixel-division method.

In the liquid crystal display disclosed in Japanese Laid-Open Patent Publication No. 118406/1994 (Tokukaihei 6-118406), the contrast, etc. are improved by interpolating an optical anisotropic film (an optical phase-difference plate) between the liquid crystal panel and the polarization plate. A compensation plate (an optical phase-difference plate), which is disclosed in Japanese Laid-Open Patent Publication No. 194645/1994 (Tokukaihei 6-194645), has a negative refractive index because it is designed so that the in-plane refractive index in a direction parallel to the compensation-plate surface is set to virtually zero, and so that the refractive index in a direction perpendicular to the compensation-plate surface is set smaller than the in-plane refractive index. For this reason, it becomes possible to reduce the viewing-angle dependence by compensating for a positive refractive index that appears in the liquid crystal display element upon application of a voltage thereto.

The above-mentioned pixel-division method makes it possible to keep the viewing-angle characteristic virtually symmetric and consequently to eliminate the gradation-inverting phenomenon and viewing-angle dependence even in the cases when the viewing angle is inclined in upward and downward directions; however, it still fails to solve the problem of the reduction of contrast in the cases when the viewing angle is inclined in upward and downward directions. Consequently, displayed black becomes whitish and appears to a floating gray state. Further, another problem with the above-mentioned prior-art technique using the pixel-division method is that the viewing-angle dependence occurs when the viewing angle is inclined in the right or left direction.

Moreover, in the above-mentioned method wherein the optical phase-difference plate is incorporated into the pixel-division method, since the ratio in which the pixel is divided is set to the same in the liquid crystal display, the reduction of contrast in the cases when the viewing angle is inclined in upward and downward directions can be prevented only in a limited manner. The reasons for this are explained as follows:

In the above-mentioned pixel-division method, since the ratio of division of the pixel is the same, viewing-angle characteristics of the TN liquid crystal display element in the positive viewing-angle direction (from the direction perpendicular to the screen to an increasing direction of display contrast) and the negative viewing-angle direction (from the direction perpendicular to the screen to a decreasing direction of display contrast) are averaged. However, since the actual viewing-angle characteristics in the positive viewing-angle direction and negative viewing-angle direction are reversed to each other, it is difficult to suppress the reduction of contrast in the upward and downward directions in a uniform manner even if the optical phase-difference plate is incorporated into the pixel-division method. In particular, when the viewing angle is inclined in the positive viewing-angle direction, the gradation-inverting phenomenon tends to occur and the display images tend to be blurred into black.

Furthermore, in the pixel-division method, the liquid crystal layer is generally divided along a direction parallel to the scanning-electrode lines or signal-electrode lines. However, for example, in an active-matrix liquid crystal display, each division of the liquid crystal layer is subject to lines of electric force that are exerted between the pixel electrodes through which voltages are applied thereto and electrode lines (scanning-electrode lines or signal-electrode lines) or pixel electrodes adjacent to the pixel electrodes.

For example, as illustrated in FIG. 25, in the case when a liquid crystal layer 101 is divided into two, that is, the first liquid crystal layer 101a and the second liquid crystal layer 101b, liquid crystal molecules 103 located in the vicinity of the electrode lines 102 tend to line up in a direction along lines of electric force F that have been caused by the electrode lines 102. For this reason, unstably oriented portions K and M (indicated by shaded regions) appear along pixel edges in which liquid crystal molecules 103 inclined in directions reversed to the lines of electric force F are located. More specifically, the liquid crystal molecules 103 in the unstably oriented portion K in the first liquid crystal layer 101a tend to line up in the orientation direction of the second liquid crystal layer 101b, while the liquid crystal molecules 103 in the unstably oriented portion M in the second liquid crystal layer 101b tend to line up in the orientation direction of the first liquid crystal layer 101a.

When unstable orientation occurs at the pixel edges, the border 101c between the first and second liquid crystal layers 101a and 101b is likely to tilt since its ends are shifted respectively in directions indicated by arrows $C_1$ and $C_2$. The above-mentioned tilt of the border 101c causes unevenness of display, making it difficult to obtain uniform image quality.

SUMMARY OF THE INVENTION

The objective of the present invention is to provide a liquid crystal display which eliminates a gradation-inverting phenomenon in up and down directions and in right and left directions, as well as eliminating a coloring phenomenon in up and down directions, and which is free from display unevenness with high contrast.

In order to achieve the above-mentioned objectives, the liquid crystal display of the present invention is provided with: a liquid crystal display element that is constituted by a pair of light-transmitting substrates having opposing surfaces on which a transparent electrode and an alignment film are respectively formed, and a liquid crystal layer that is interpolated between the substrates; a pair of polarizers that are placed on both sides of the liquid crystal display element; and an optical phase-difference plate that is interpolated at least in either of the gaps between the liquid crystal display element and the pair of the polarizers. In this arrangement, the above-mentioned liquid crystal layer in each pixel is oriented by the alignment film in different directions so that it is divided into divisions of the liquid crystal layer having respectively different sizes.

The above-mentioned liquid crystal display has divisions of the liquid crystal layer that are divided with different ratios, and the optical phase-difference plate is interpolated between the liquid crystal display element having the divisions of the liquid crystal layer whose orientation states are controlled as described above and the polarizers. This arrangement makes it possible to eliminate the difference between the reversed viewing-angle characteristics in the positive viewing-angle direction and negative viewing-angle direction so that both of the viewing-angle characteristics become closer to each other. Therefore, it is possible to uniformly suppress the degradation of contrast that tends to occur when the viewing angle is inclined in up and down directions as well as the problem of whitish appearance of the display images. In particular, black can be displayed more sharply.

Therefore, the application of the above-mentioned liquid crystal display improves display quality to a great degree as compared with conventional liquid crystal displays.

Additionally, it is more preferable to provide the optical phase-difference plates on both sides of the liquid crystal display element; however, even the installation of the plate on one side of the liquid crystal display element improves the viewing-angle characteristic as described above.

For a fuller understanding of the nature and advantages of the invention, reference should be made to the ensuing detailed description taken in conjunction with the

DESCRIPTION OF THE EMBODIMENTS

[Embodiment 1]

Referring to FIGS. 1 through 16, the following description will discuss one embodiment of the present invention.

Figure 1:
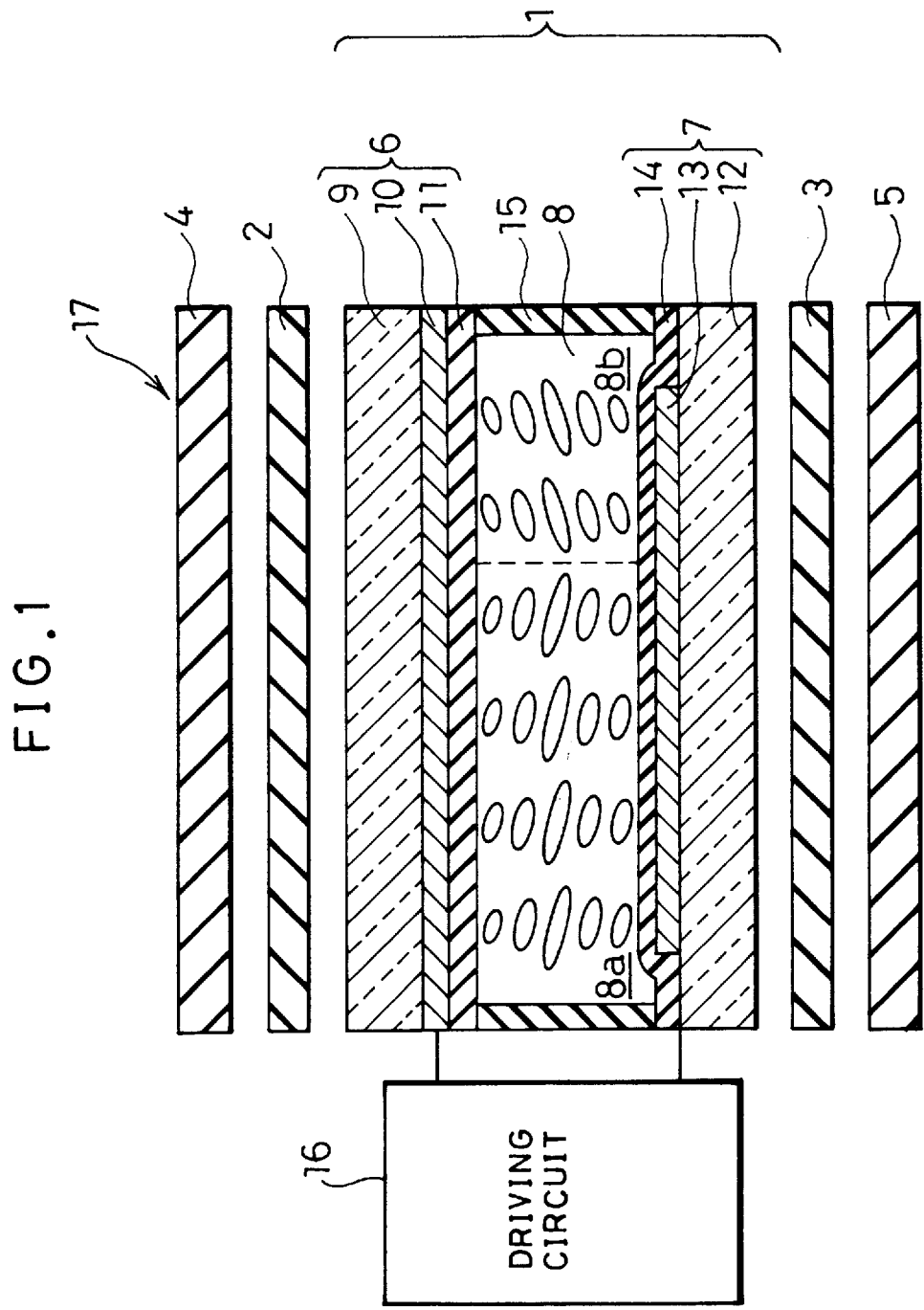
FIG. 1 is an exploded cross-sectional view that shows a construction of a liquid crystal display of one embodiment of the present invention.

As illustrated in FIG. 1, the liquid crystal display of the present invention is provided with a liquid crystal display element 1, a pair of optical phase-difference plates 2 and 3, and a pair of polarization plates 4 and 5.

The liquid crystal display element 1 is constituted by electrode substrates 6 and 7 that are placed face to face with each other and a liquid crystal layer 8 that is sandwiched in between. The electrode substrate 6 is constructed as follows: a glass substrate (a light-transmitting substrate) 9 is provided as a base, a transparent electrode 10, made of ITO (Indium Tin Oxide), is formed on the surface of the glass substrate 9 on the liquid crystal layer 8 side, and an alignment film 11 is formed thereon. The electrode substrate 7 is also constructed in the same manner; a glass substrate (a light-transmitting substrate) 12 is provided as a base, a transparent electrode 13, made of ITO, is formed on the surface of the glass substrate 12 on the liquid crystal layer 8 side, and an alignment film 14 is formed thereon.

Although FIG. 1 shows a construction corresponding to one pixel for convenience of explanation, the transparent electrodes 10 and 13, which are strips with a predetermined width, are respectively placed on the glass substrates 9 and 12 with predetermined intervals all over the liquid crystal display element 1, and are designed so that they are orthogonal to each other on the glass substrates 9 and 12, when viewed in a direction perpendicular to the substrate surfaces. Each portion at which the transparent electrodes 10 and 13 intersect each other corresponds to a pixel for carrying out a display, and the pixels are placed in a matrix format over the entire structure of the present liquid crystal display.

The electrode substrates 6 and 7 are bonded by seal resin 15, and a liquid crystal layer 8 is sealed inside the space that has been formed by the electrode substrates 6 and 7 and the seal resin 15. Further, voltages, generated based on display data, are applied to the transparent electrodes 10 and 13 by the driving circuit 16.

In the present liquid crystal display, a unit, which is formed by incorporating optical phase-difference plates 2 and 3 and polarization plates (polarizers) 4 and 5 into the above-mentioned liquid crystal display element 1, is referred to as a liquid crystal cell 17.

Each of the alignment films 11 and 14 has two regions that have respectively different states. With this arrangement, the first division-section (the first division liquid crystal layer) 8a and the second division-section (the second division liquid crystal layer) 8b, which face the two regions in the liquid crystal layer 8, are controlled so as to have different orientation states in their liquid crystal molecules. The alignment films 11 and 14 impart the above-mentioned different orientation states by applying different pretilt angles to the liquid crystal molecules and making tilting directions of the liquid crystal molecules opposite to each other with respect to the direction perpendicular to the substrate surface, between the two regions.

Figure 2:
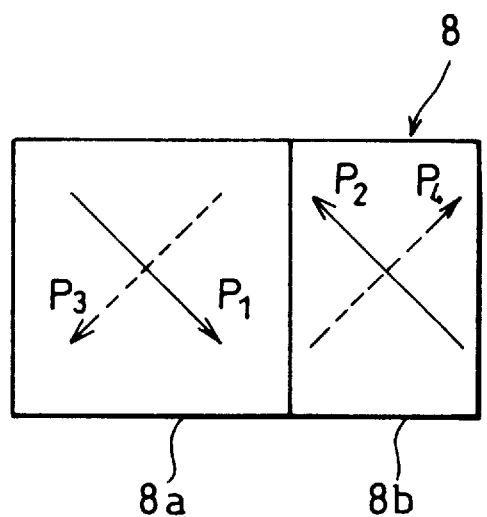
FIG. 2 is an explanatory drawing that shows pretilt directions of liquid crystal molecules in one pixel of a liquid crystal display element installed in the above-mentioned liquid crystal display.

More specifically, the liquid crystal layer 8 is divided in its orientation so that the ratio of sizes of the first division-section 8a and the second division-section 8b is set at 17:3. Further, as illustrated in FIG. 2, with respect to the first division-section 8a and the second division-section 8b, liquid crystal molecules are oriented with respective pretilt directions that are orthogonal to each other. Moreover, pretilt directions $P_1$ and $P_2$ (indicated by solid lines) of the alignment film 11 are set so that they are reversed to each other between the first division-section 8a and the second division-section 8b. Pretilt directions $P_3$ and $P_4$ (indicated by broken lines) of the alignment film 14 are also set so that they are reversed to each other in the same manner.

Here, the liquid crystal layer 8 may be divided along either of the lengthwise directions of the transparent electrodes 10 and 13.

The liquid crystal layer 8, which has been oriented as described above, has a refractive-index anisotropy of 0.092, and is formed by a nematic liquid crystal material with a chiral agent added thereto so as to have a thickness of approximately 4.5 μm.

The optical phase-difference plates 2 and 3 are respectively interpolated between the liquid crystal display element 1 and the polarization plates 4 and 5 that are placed on both sides thereof. Each of the optical phase-difference plates 2 and 3 is formed as follows: a support base made of a transparent organic polymeric material is provided, and discotheque liquid crystal is oblique-oriented or hybrid-oriented onto the support base, and is crosslinked. Thus, index ellipsoids in the optical phase-difference plates 2 and 3, which will be described later, are formed in an inclined fashion with respect to the optical phase-difference plates 2 and 3.

With respect to the support base of the optical phase-difference plates 2 and 3, triacetylcellulose (TAC), which is generally used for polarization plates, is suitably applied with high reliability. Besides this, colorless, transparent organic polymeric films made of polycarbonate (PC), polyethyleneterephthalate (PET), etc., which are superior in weather resistance and chemical resistance, are also suitably applied.

Figure 3:
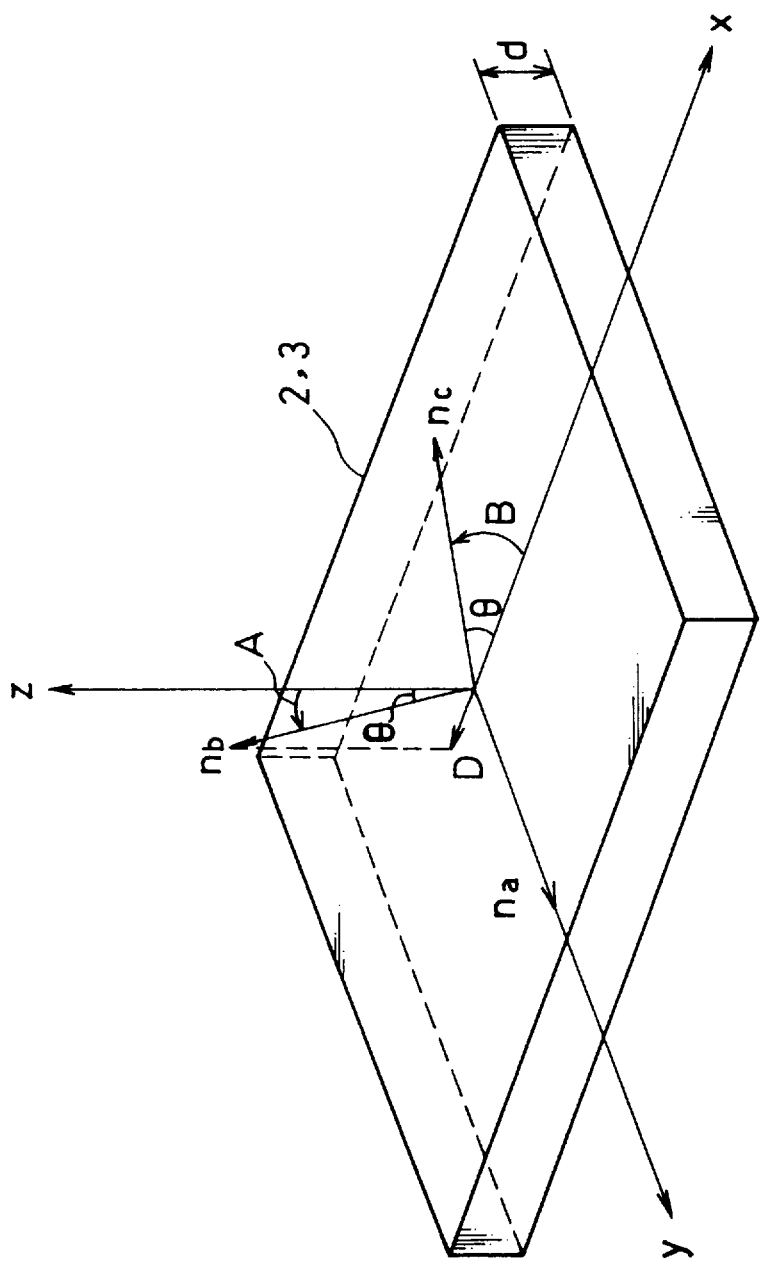
FIG. 3 is a perspective view that shows a principal refractive index in an optical phase-difference plate in the liquid crystal display element.

As illustrated in FIG. 3, each of the optical phase-difference plates 2 and 3 has principal refractive indexes $n_a$, $n_b$ and $n_c$, which have three different directions respectively. The direction of the principal refractive index $n_a$ coincides with the direction of the y-coordinate axis among the x, y, and z-coordinate axes that are orthogonal to each other. The direction of the principal refractive index $n_b$ is inclined by θ (θ: approximately 20°) in the direction of an arrow A with respect to the z-coordinate axis that is perpendicular to the surface of the optical phase-difference plates 2 and 3 that corresponds to the screen. The direction of the principal refractive index $n_c$ is inclined by θ in the direction of an arrow B with respect to the x-coordinate axis (the above-mentioned surface).

These principal refractive indexes of the optical phase-difference plates 2 and 3 satisfy the following relationship: $n_a = n_c > n_b$. With this arrangement, since only one optical axis exists, the optical phase-difference plates 2 and 3 have a uniaxial property. Further, the first retardation value of the optical phase-difference plates 2 and 3 $(n_c - n_a) \times d$ is virtually 0 nm, and the second retardation value $(n_c - n_b) \times d$ is virtually 200 nm. Therefore, the refractive-index anisotropy of the optical phase-difference plates 2 and 3 is negative. Here, $n_c - n_a$ and $n_c - n_b$ represent the refractive-index anisotropy Δn, and d represents the thickness of each of the optical phase-difference plates 2 and 3.

Figure 4:
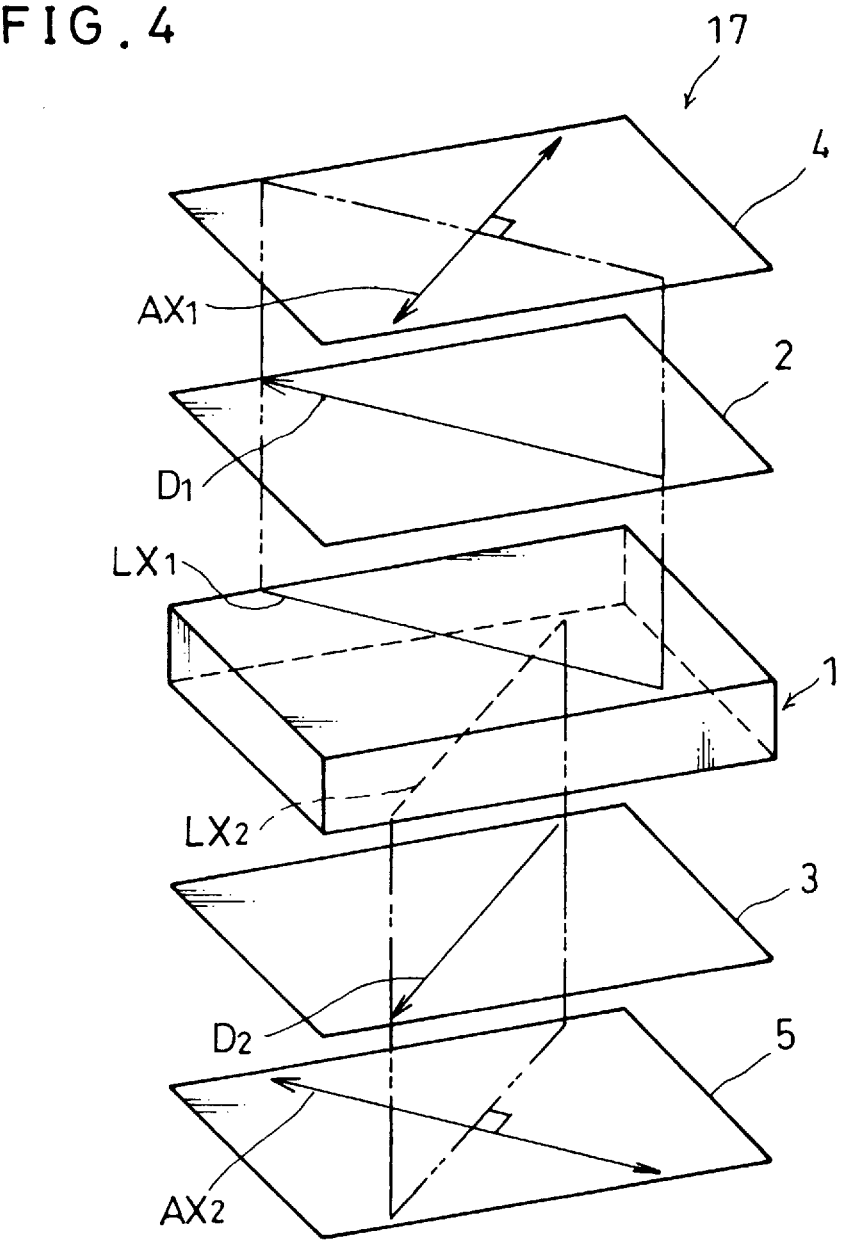
FIG. 4 is a perspective view in which respective components of the liquid crystal display element are exploded so as to show the optical layout of polarizers and the optical phase-difference plate in the above-mentioned liquid crystal display element.

As illustrated in FIG. 4, the polarization plates 4 and in the liquid crystal display element 1 are arranged so that their transmission axes $AX_1$ and $AX_2$ are respectively orthogonal to the long axes $LX_1$ and $LX_2$ of liquid crystal molecules that contact the alignment films 11 and 14. In the present liquid crystal display, since the long axes $LX_1$ and $LX_2$ are orthogonal to each other, the transmission axes $AX_1$ and $AX_2$ are also orthogonal to each other.

Here, as illustrated in FIG. 3, a direction which is formed by projecting the direction of the principal refractive index $n_b$, which is inclined in the direction to impart the anisotropy to the optical phase-difference plates 2 and 3, onto the surfaces of the optical phase-difference plates 2 and 3 is defined as direction D. As illustrated in FIG. 4, the optical phase-difference plate 2 is placed so that direction D (direction $D_1$) is parallel to the long axis $LX_1$, and the optical phase-difference plate 3 is placed so that direction D (direction $D_2$) is parallel to the long axis $LX_2$.

With the above-mentioned arrangement of the optical phase-difference plates 2 and 3 and the polarization plates 4 and 5, the present liquid crystal display carries out the so-called normally white display wherein light is allowed to pass during off-time so that white display is provided.

In general, in optical anisotropic materials such as liquid crystal and phase-difference plates (phase-difference films), the above-mentioned anisotropy including the three-dimensional principal refractive indexes $n_a$, $n_c$ and $n_b$ is represented by an index ellipsoid. The refractive-index anisotropy Δn assumes a different value depending on which direction the index ellipsoid is observed from.

The present liquid crystal display is arranged so that a direction (the direction related to the principal refractive index $n_c$) in which the index ellipsoid of the optical phase-difference plate 2 is inclined with respect to the optical phase-difference plate 2 and the pretilt direction of liquid crystal molecules that contact the alignment film 11 in the first division section 8a that is larger than the second division section 8b in the liquid crystal layer 8 are opposite to each other with respect to the z-direction. Further, a direction (the direction related to the principal refractive index $n_c$) in which the index ellipsoid of the optical phase-difference plate 3 is inclined with respect to the optical phase-difference plate 3 and the pretilt direction of liquid crystal molecules that contact the alignment film 14 in the first division section 8a are opposite to each other with respect to the z-direction. Further, in the index ellipsoid having $n_a$, $n_c$ and $n_b$ in its axes, since $n_a = n_c > n_b$ holds, a cross-section, formed by a wave front of light that propagates in the $n_b$ direction, has a round shape.

The following description will explain the results of measurements on the viewing-angle dependence of the present liquid crystal display having the above-mentioned arrangement.

Figure 5:
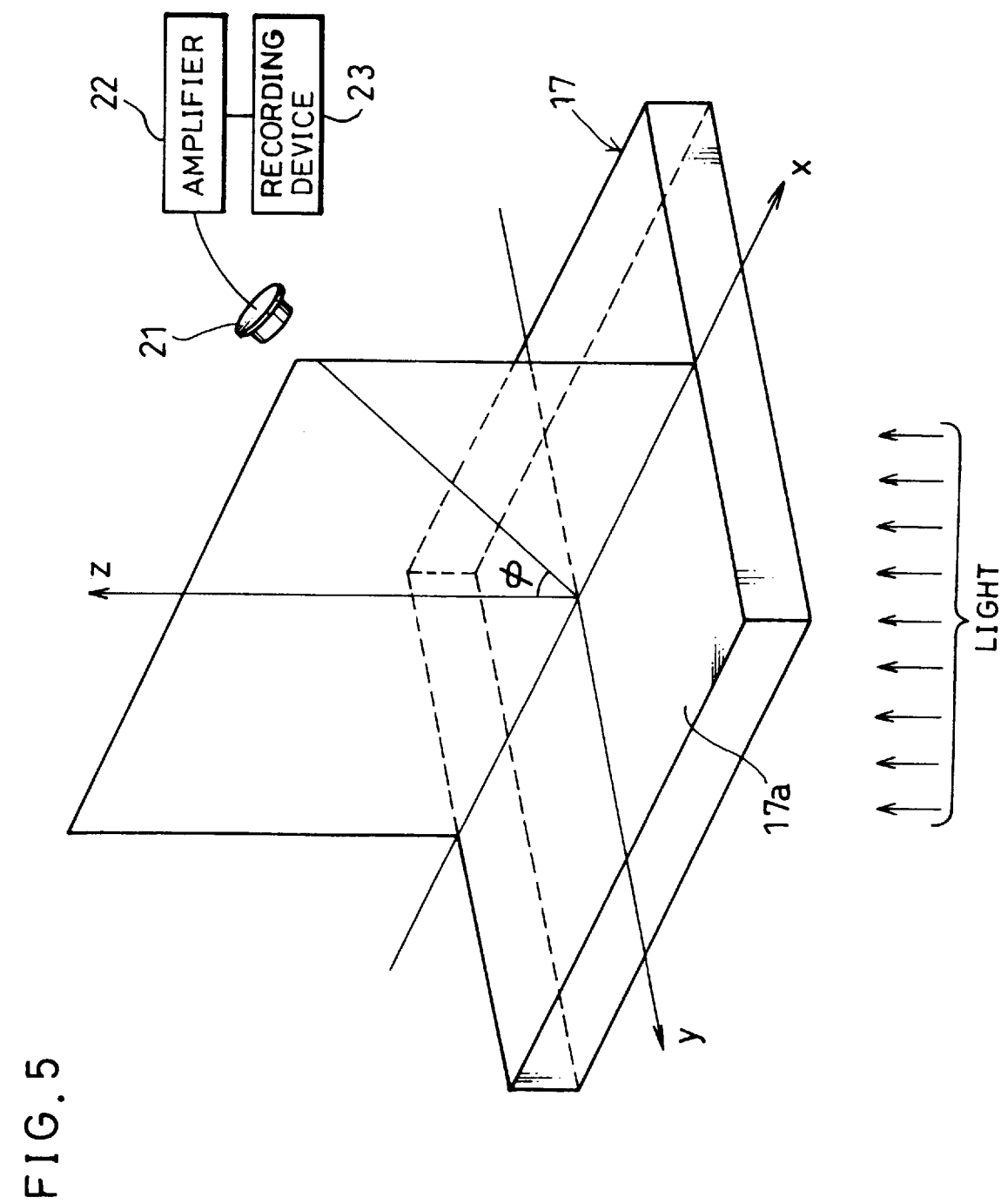
FIG. 5 is a perspective view that shows a measuring system that is used to measure the viewing-angle dependence of the liquid crystal display element.

As illustrated in FIG. 5, the measuring system on the viewing-angle dependence of the present liquid crystal display is provided with a light-receiving element 21, an amplifier 22 and a recording device 23. Further, the liquid crystal cell 17 is placed so that the surface 17a on the glass substrate 9 side is located on the reference surface x-y of the rectangular coordinates x,y and z. The light-receiving element 21 is an element capable of receiving light with a constant stereoscopic light-receiving angle, and is placed at a position a predetermined distance apart from the coordinate origin in a direction making an angle φ (viewing angle) with respect to the z-direction that is perpendicular to the surface 17a.

During the measuring process, monochromatic light with a wavelength of 550 nm is directed to the liquid crystal cell 17 installed in the present measuring system from the surface on the side opposite to the surface 17a. One part of the monochromatic light that has passed through the liquid crystal cell 17 is made incident on the light-receiving element 21. The output of the light-receiving element 21, after having been amplified to a predetermined level by the amplifier 22, is recorded by the recording device 23 such as a waveform memory or a recorder.

Figure 6:
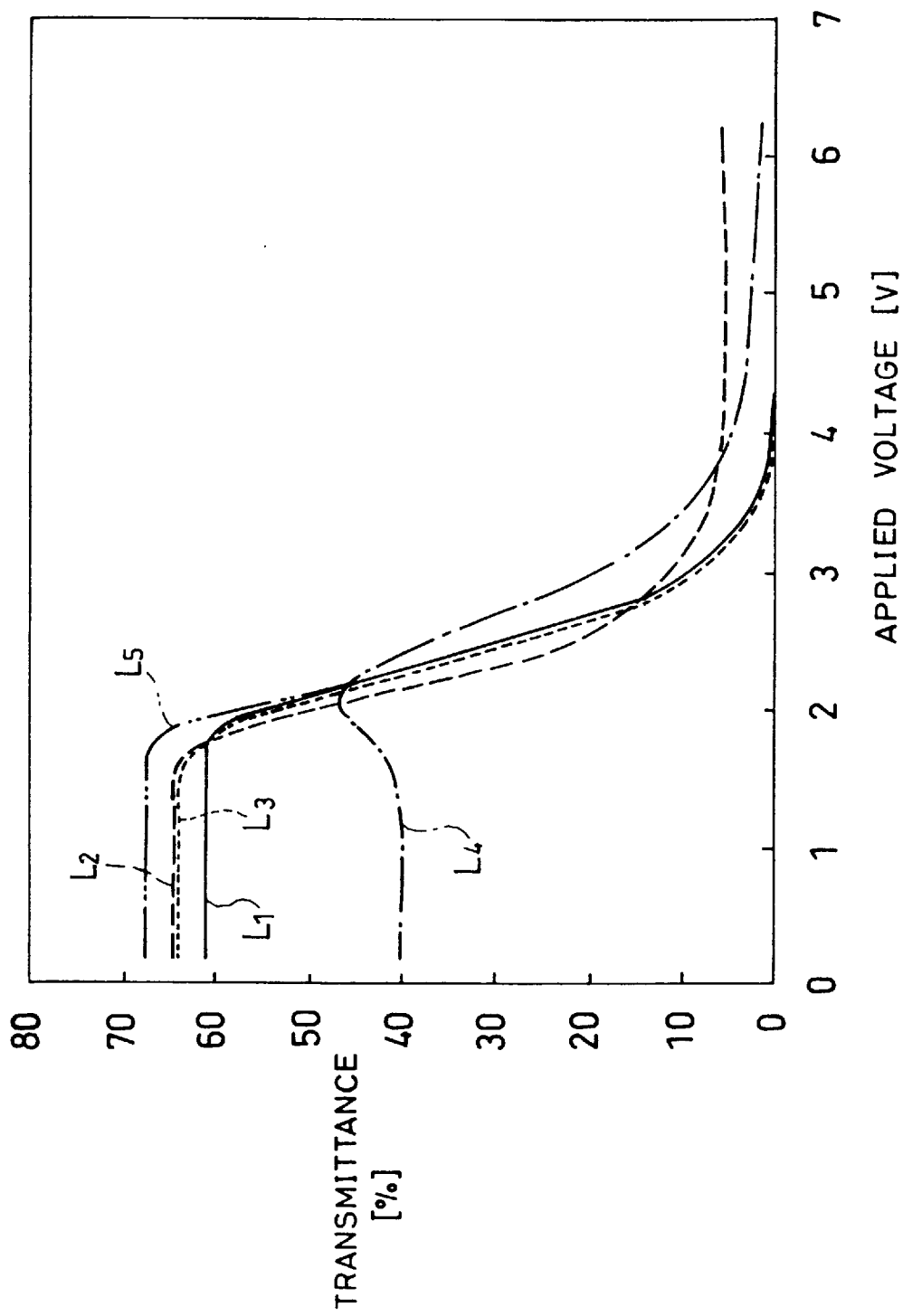
FIG. 6 is a graph that indicates the transmittance vs. applied voltage characteristic of the liquid crystal display element in the case when the ratio of orientation divisions of the liquid crystal layer is set to 17:3.

FIG. 6 shows the results of the measurements that have been made by the above-mentioned measuring system. FIG. 6 is a graph that indicates the transmittance of light with respect to the voltage that is applied to the liquid crystal cell 17. The measurements were made by arranging the light-receiving element 21 so that the viewing angle φ is set at 30°, while the position of the light-receiving element 21 was changed respectively to the upper side (at 12 o'clock), the left side (at 9 o'clock), the lower side (at 6 o'clock) and the right side (at 3 o'clock), supposing that the y-direction points the upper side of the screen and the x-direction points the left side of the screen. Moreover, the same measurements were carried out with the light-receiving element 21 being placed in the z-direction.

In the above-mentioned graph, curve $L_1$, indicated by a solid line, represents the characteristic in the z-direction; curve $L_2$, indicated by a broken line, the characteristic in the 6 o'clock direction; curve $L_3$, indicated by a dotted line, the characteristic in the 3 o'clock direction; curve $L_4$, indicated by an alternate long and short dashes line, the characteristic in the 12 o'clock direction; and curve $L_5$, indicated by an alternate long and two short dashes line, the characteristic in the 9 o'clock direction, respectively.

Consequently, it was confirmed that in the transmittance vs. applied voltage characteristic within a gray-scale display region, the curves $L_2$, $L_3$, $L_4$ and $L_5$ are close to the curve $L_1$. Therefore, in the gray-scale display region, it is possible to obtain virtually the same viewing-angle characteristic even if the viewing angle is inclined toward any direction of the up and down directions and right and left directions with respect to the screen.

With respect to the measurement in the 6 o'clock direction, the transmittance was kept at a low constant value of approximately 7% in the on-region, and no gradation-inverting phenomenon was confirmed. Further, with respect to the measurement in the 12 o'clock direction, the transmittance in the on-region was a lower value than that measured in the 6 o'clock direction; thus, a sufficient reduction was confirmed.

Here, in the present liquid crystal display, the above-mentioned improvement in the viewing-angle characteristic can be virtually obtained, as long as the ratio of sizes of the first division-section 8a and the second division-section 8b is set in the rage of 6:4 to 19:1.

Figure 7:
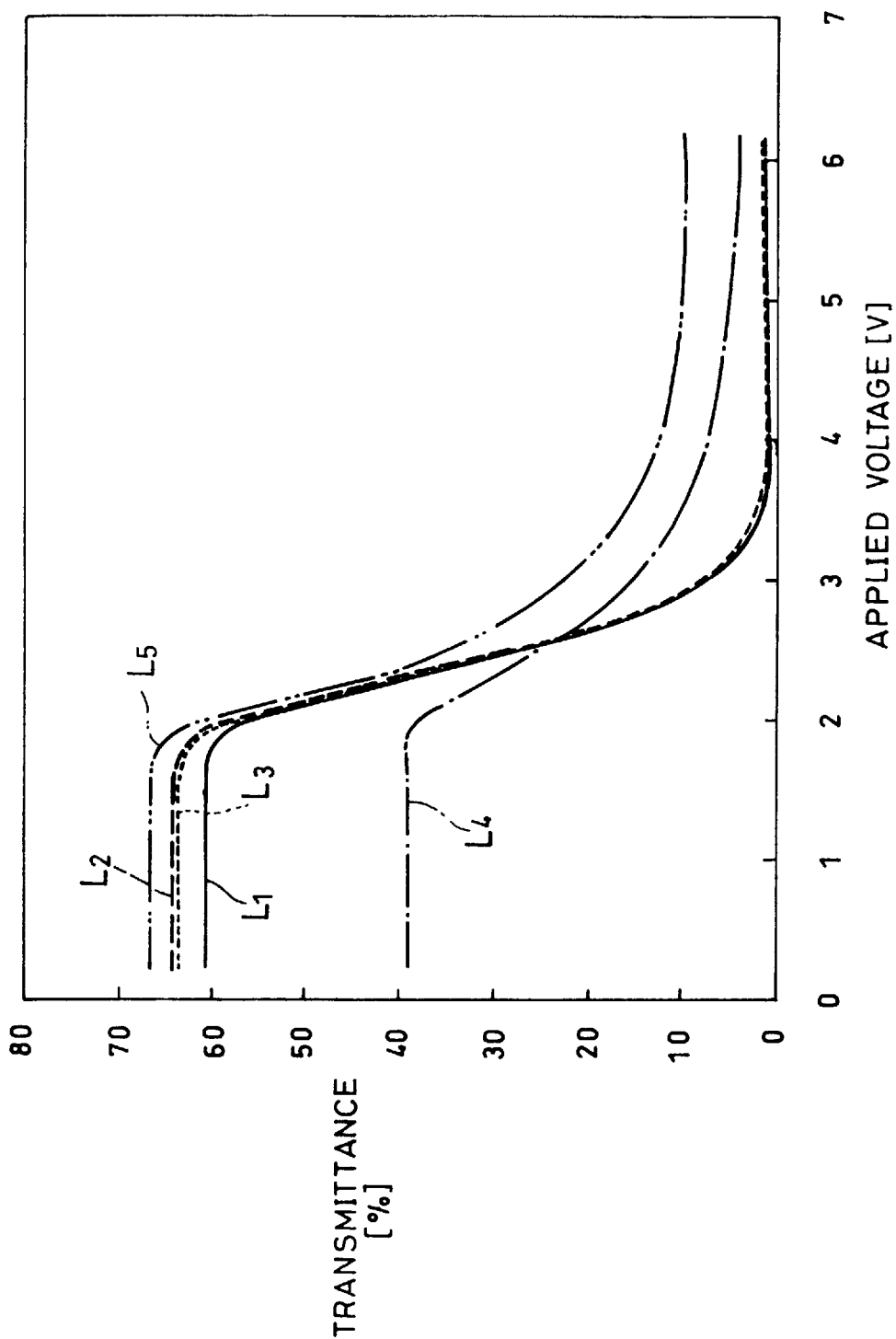
FIG. 7 is a graph that indicates the transmittance vs. applied voltage characteristic of the liquid crystal display element in the case when the ratio of orientation divisions of the liquid crystal layer is set to 6:4.
Figure 8:
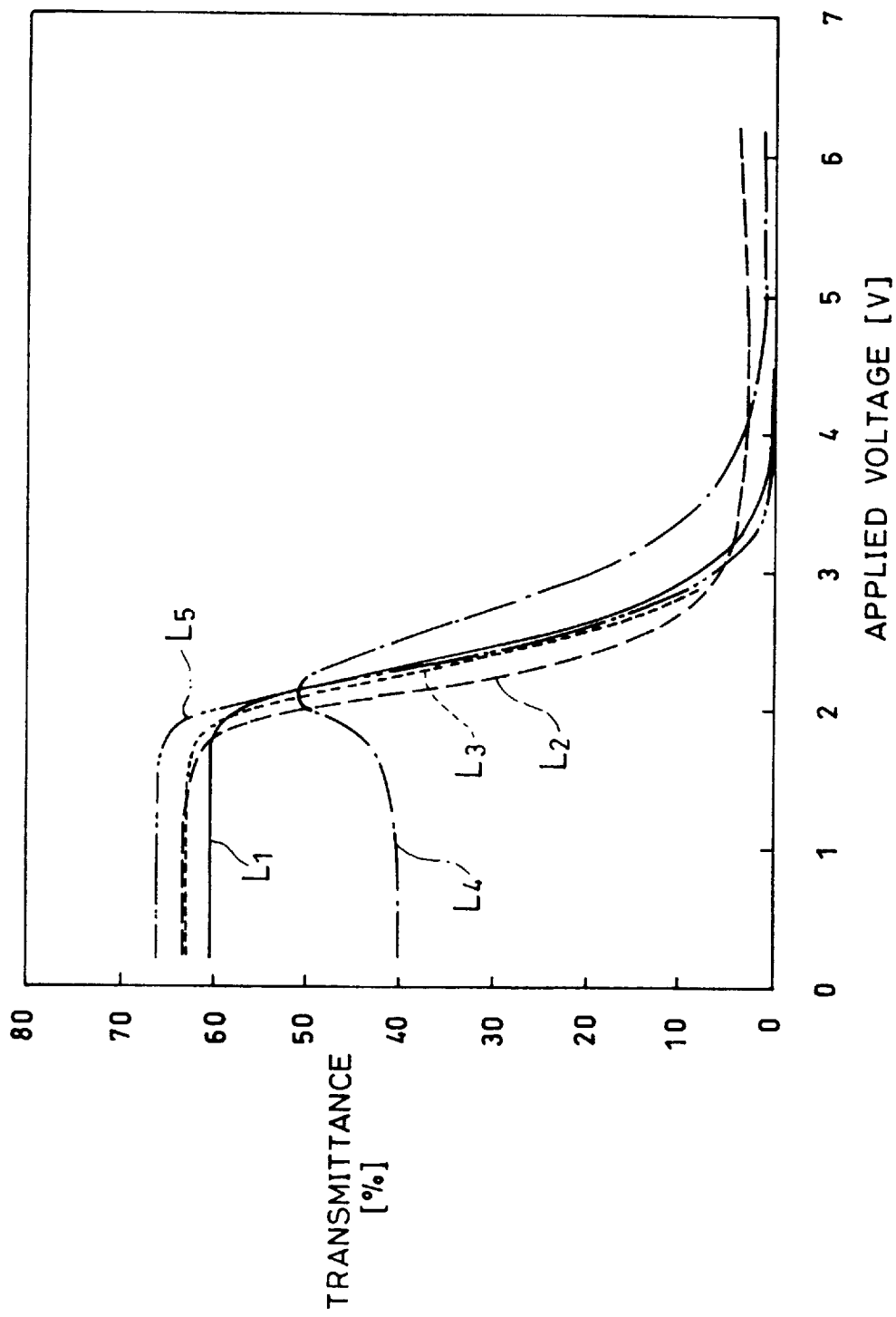
FIG. 8 is a graph that indicates the transmittance vs. applied voltage characteristic of the liquid crystal display element in the case when the ratio of orientation divisions of the liquid crystal layer is set to 19:1.

More specifically, as illustrated in FIG. 7, a tendency for the curve $L_2$ (at 6 o'clock) and the curve $L_4$ (at 12 o'clock) to come closer to each other in the gray-scale region and the on-region appears at the division ratio of 6:4, and the tendency becomes stronger as the division ratio increases. Moreover, as illustrated in FIG. 8, a tendency for the curve $L_2$ (at 6 o'clock) to come closer to the curve $L_1$ (the z-direction) appears at a division ratio of 19:1, and the tendency becomes stronger as the division ratio decreases. Consequently, the phenomenon causing display images to be blurred into black is suppressed with respect to the 6 o'clock direction (the positive viewing-angle direction).

In addition, when the division ratio is set in the range of 7:3 to 9:1, a substantial improvement in the viewing-angle characteristic is obtained with a better balanced state in the 6 o'clock direction as well as the 12 o'clock direction as in the aforementioned case of 17:3.

Moreover, in the present liquid crystal display, the two optical phase-difference plates 2 and 3 are installed on both sides of the liquid crystal element 1; however, the application of either one of them may achieve the above-mentioned viewing-angle characteristic. In the application of one plate, although the viewing-angle characteristic in the up and down directions can be improved with a well-balanced state, the viewing-angle characteristic in the right and left directions becomes asymmetric. In contrast, in the application of two plates, the viewing-angle characteristic in the up and down directions is improved as in the case of the application of one plate, and the viewing-angle characteristic in the right and left directions becomes symmetric, and is also improved as in the case of the up and down directions.

Next, an explanation will be given of a comparative example of the present embodiment.

Figure 9:
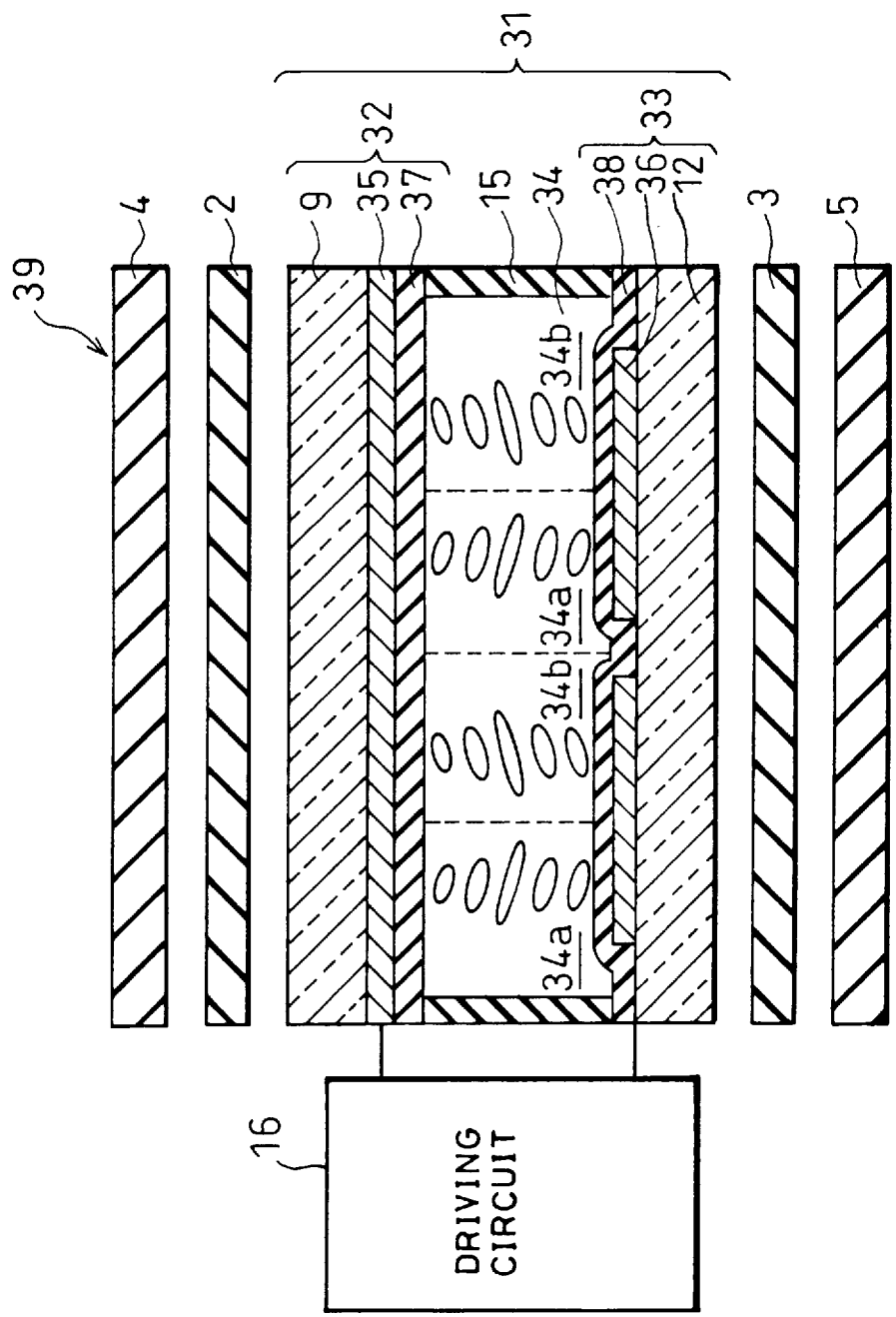
FIG. 9 is an exploded cross-sectional view that shows a construction of a liquid crystal display of a comparative example with respect to the embodiment of the present invention.

As illustrated in FIG. 9, the liquid crystal display of the present comparative example is provided with a liquid crystal display element 31, a pair of optical phase-difference plates 2 and 3, and a pair of polarization plates 4 and 5. Here, for convenience of explanation, FIG. 9 shows a construction corresponding to two pixels in an enlarged manner.

The liquid crystal display element 31 is constituted by electrode substrates 32 and 33 that are bonded to each other by a seal resin 15 and a liquid crystal layer 34 that is sandwiched between the electrode substrates 32 and 33. The electrode substrates 32 and 33 are constructed by forming transparent electrodes 35 and 36 that are made of ITO on respective glass substrates 9 and 12, and by further forming alignment films 37 and 38 thereon. Further, a liquid crystal cell 39 is constructed by forming the optical phase-difference plates 2 and 3 and the polarization plates 4 and 5 on both of the surfaces of the liquid crystal display element 31.

Each of the transparent electrodes 35 and 36 is installed for each pixel, in the same manner as the transparent electrodes 10 and 13. The pixels, each of which is formed at an intersection of the transparent electrodes 35 and 36, are placed in a matrix format as a whole on the present liquid crystal display.

Each of the alignment films 37 and 38 has two different regions with respect to one pixel. These two regions allow the respective liquid crystal molecules of the liquid crystal layer 34 to be oriented in mutually different directions. With this arrangement, the first division-section 34a and the second division-section 34b, which face the two regions of the alignment films 37 or 38 in the liquid crystal layer 34, are controlled so as to have different orientation states in their liquid crystal molecules. In the same manner as the aforementioned alignment films 11 and 14, the alignment films 37 and 38 impart the above-mentioned different orientation states by applying different pretilt angles to the liquid crystal molecules and making tilt directions of the liquid crystal molecules different from each other, with respect to the different regions.

Figure 10:
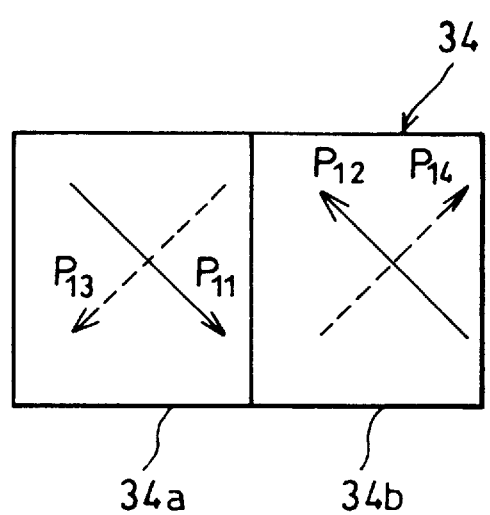
FIG. 10 is an explanatory drawing that shows pretilt angles of liquid crystal molecules in one pixel of a liquid crystal display element installed in the liquid crystal display of FIG. 9.

More specifically, the liquid crystal layer 34 is formed with a thickness of approximately 4.5 μm by the same liquid crystal material as the liquid crystal layer 8, and divided so that the ratio of sizes of the first division-section 34a and the second division-section 34b is set at 1:1. Further, as illustrated in FIG. 10, the alignment films 37 and 38 allow liquid crystal molecules to be oriented in directions that are orthogonal to each other with respect to the first division-section 34a and the second division-section 34b. Here, pretilt directions $P_{11}$ and $P_{12}$ of the alignment film 37 are set so that they are reversed to each other between the first division-section 34a and the second division-section 34b. Pretilt directions $P_{13}$ and $P_{14}$ of the alignment film 38 are also set so that they are reversed to each other in the same manner.

Figure 11:
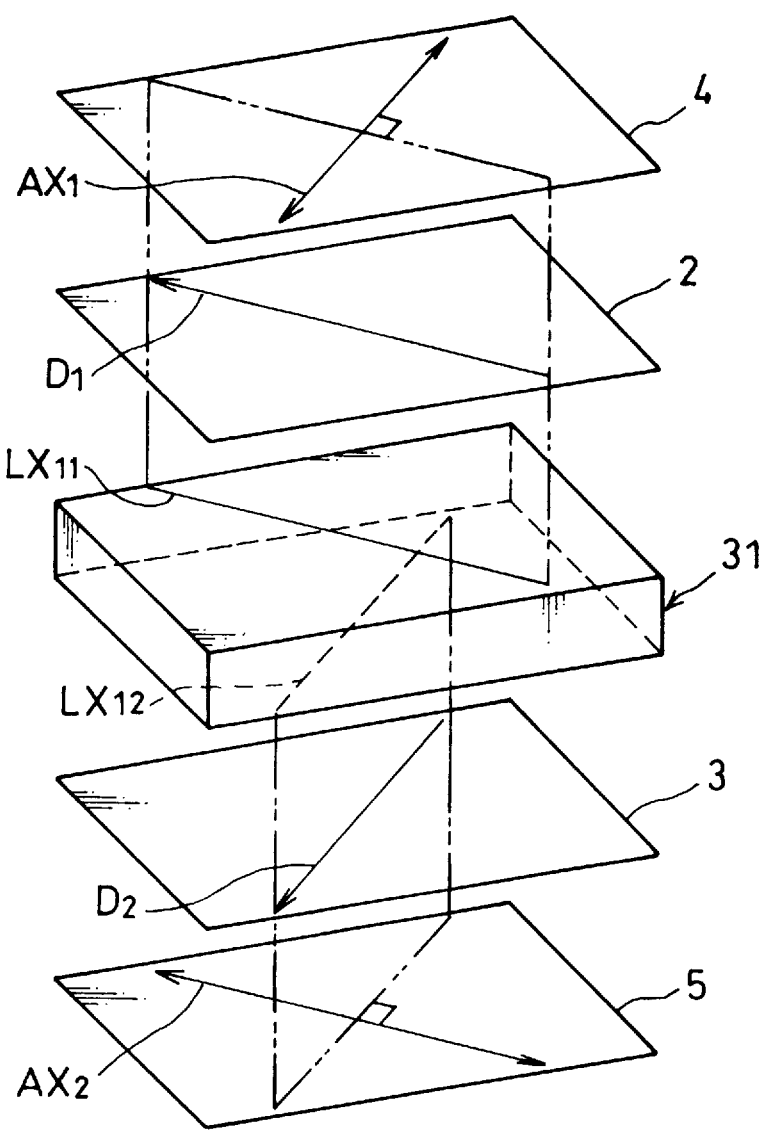
FIG. 11 is a perspective view in which respective components of the liquid crystal display element are exploded so as to show the optical layout of polarizers and the optical phase-difference plate in the liquid crystal display element of FIG. 9.

As illustrated in FIG. 11, the polarization plates 4 and 5 are arranged so that their transmission axes $AX_1$ and $AX_2$ are respectively orthogonal to the long axes $LX_{11}$ and $LX_{12}$ of liquid crystal molecules that contact the alignment films 37 and 38. Further, the optical phase-difference plate 2 is placed so that the direction $D_1$ is parallel to the long axis $LX_{11}$, and the optical phase-difference plate 3 is placed so that the direction $D_2$ is parallel to the long axis $LX_{12}$. Therefore, the present liquid crystal display carries out the so-called normally white display wherein light is allowed to pass during off-time so that white display is provided.

Figure 12:
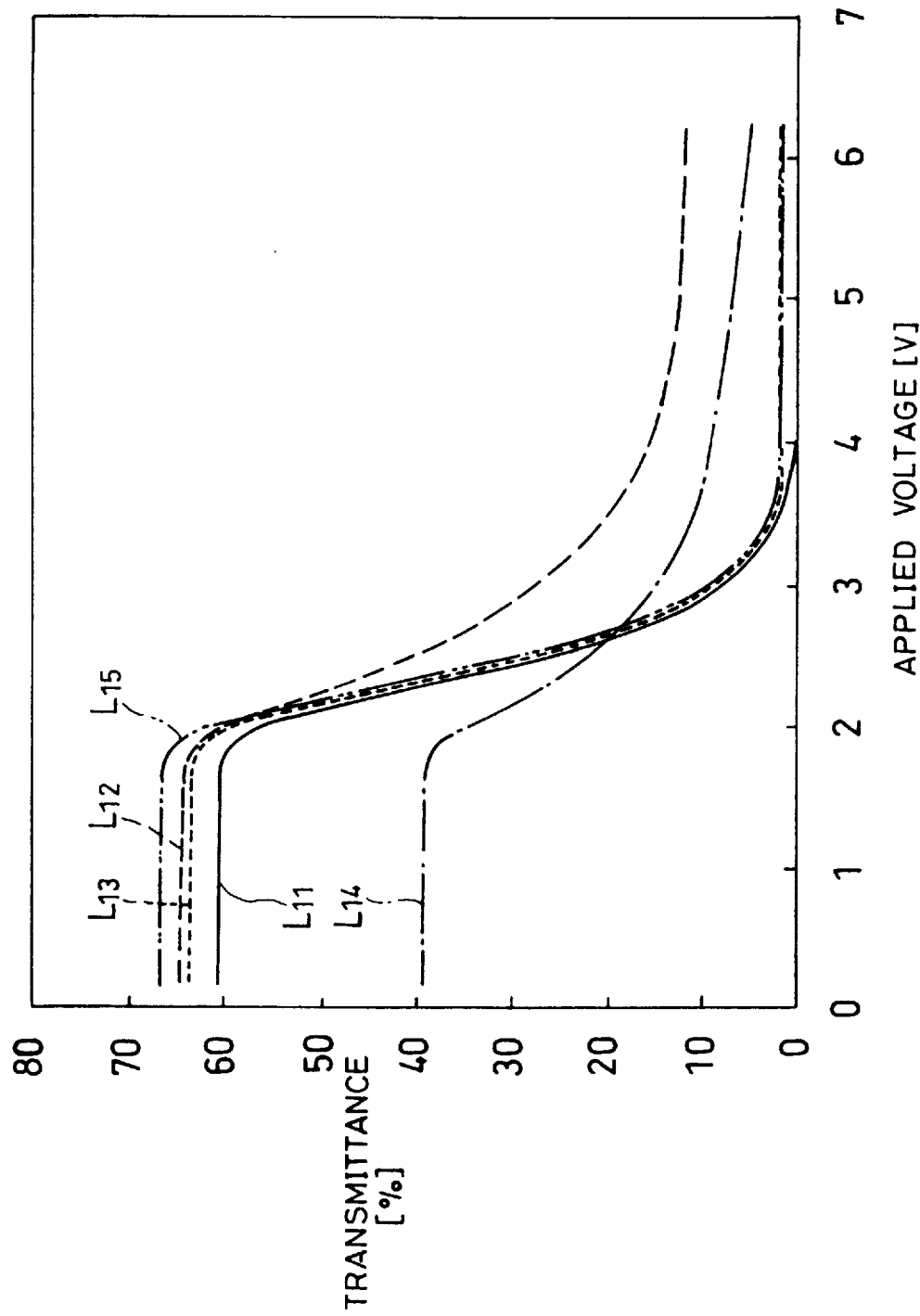
FIG. 12 is a graph that indicates the transmittance vs. applied voltage characteristic of the liquid crystal display element of FIG. 9.

With respect to the liquid crystal display having the above-mentioned arrangement, the measuring system, shown in FIG. 5, was provided in the same manner as the liquid crystal display as shown in FIG. 1, and measurements were carried out on the viewing-angle dependence. The results of the measurements are shown in FIG. 12 that is a graph indicating the transmittance vs. applied voltage characteristic. In this graph, curve $L_{11}$, indicated by a solid line, represents the characteristic in the z-direction; curve $L_{12}$, indicated by a broken line, the characteristic in the 6 o'clock direction; curve $L_{3}$, indicated by a dotted line, the characteristic in the 3 o'clock direction; curve $L_{14}$, indicated by an alternate long and short dashes line, the characteristic in the 12 o'clock direction; and curve $L_{15}$, indicated by an alternate long and two short dashes line, the characteristic in the 9 o'clock direction, respectively.

As a result, with respect to the 3 o'clock and 9 o'clock directions, it was confirmed that a sufficiently low transmittance is obtained during the on-state, and that no problem is raised with the viewing-angle characteristic. In contrast, with respect to the 6 o'clock and 12 o'clock directions, it was confirmed that it is not possible to obtain a sufficient reduction in the transmittance during the on-state.

As described above, the liquid crystal display of the present comparative example has a viewing-angle dependence in the up and down directions.

Further, an explanation will be given of another comparative example of the present embodiment.

Figure 13:
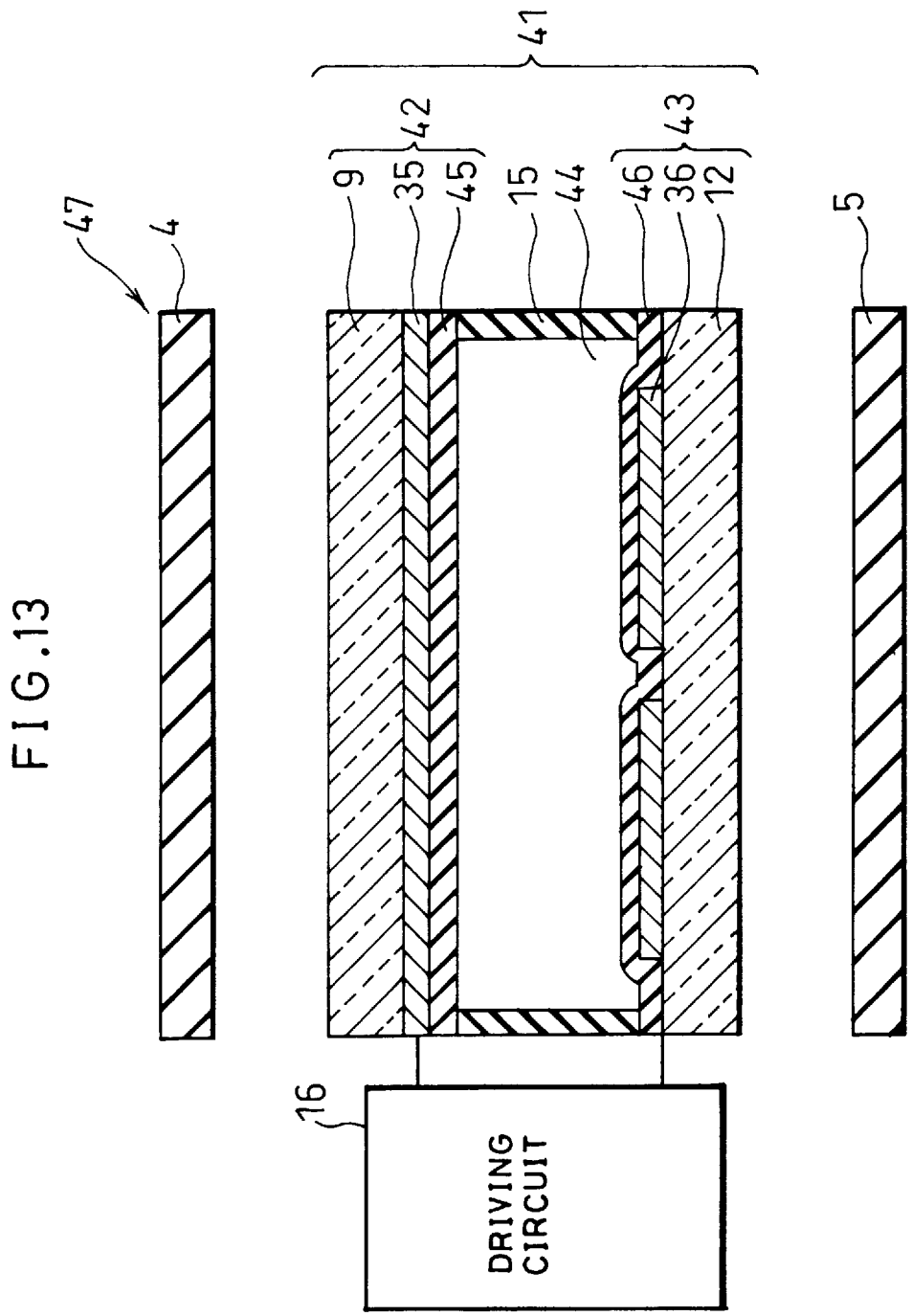
FIG. 13 is an exploded cross-sectional view that shows a construction of a liquid crystal display of another comparative example with respect to the embodiment of the present invention.

As illustrated in FIG. 13, the liquid crystal display of the present comparative example is provided with a liquid crystal display element 41 and a pair of polarization plates 4 and 5. Here, for convenience of explanation, FIG. 13 shows a construction corresponding to two pixels in an enlarged manner.

The liquid crystal display element 41 is constituted by electrode substrates 42 and 43 that are bonded to each other by a seal resin 15 and a liquid crystal layer 44 that is sandwiched between the electrode substrates 42 and 43. The liquid crystal layer 44 is formed by the same liquid crystal material as the aforementioned liquid crystal layer 8 with the same thickness. Unlike the aforementioned alignment films 11 and 14 as well as the alignment films 37 and 38, alignment films 45 and 46 allows liquid crystal molecules of the liquid crystal layer 44 to be oriented in a single direction.

Figure 14:
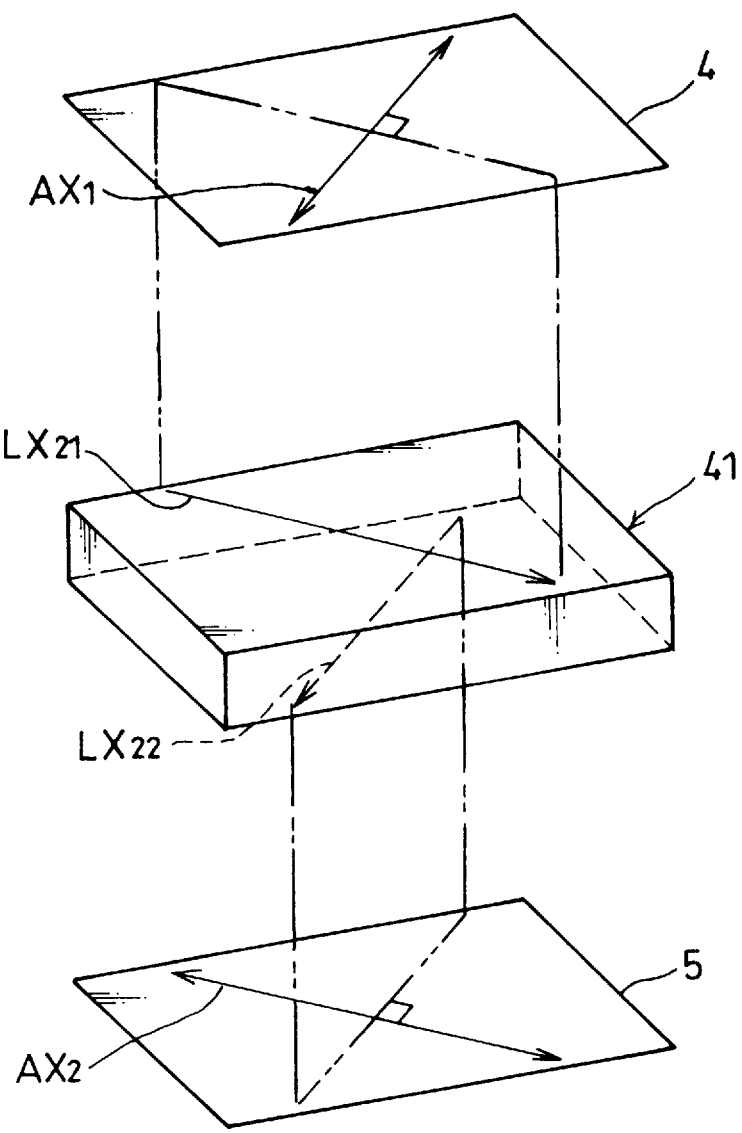
FIG. 14 is a perspective view in which respective components of the liquid crystal display element are exploded so as to show the optical layout of polarizers in the liquid crystal display element installed in the liquid crystal display of FIG. 13.

As illustrated in FIG. 14, the polarization plates 4 and 5 are arranged so that their transmission axes $AX_1$ and $AX_2$ are respectively orthogonal to the long axes $LX_{21}$ and $LX_{22}$ of liquid crystal molecules that contact the alignment films 45 and 46. A liquid crystal cell 47 is constituted by placing the polarization plates 4 and 5 on both sides of the liquid crystal display element 41 as described above.

Figure 15:
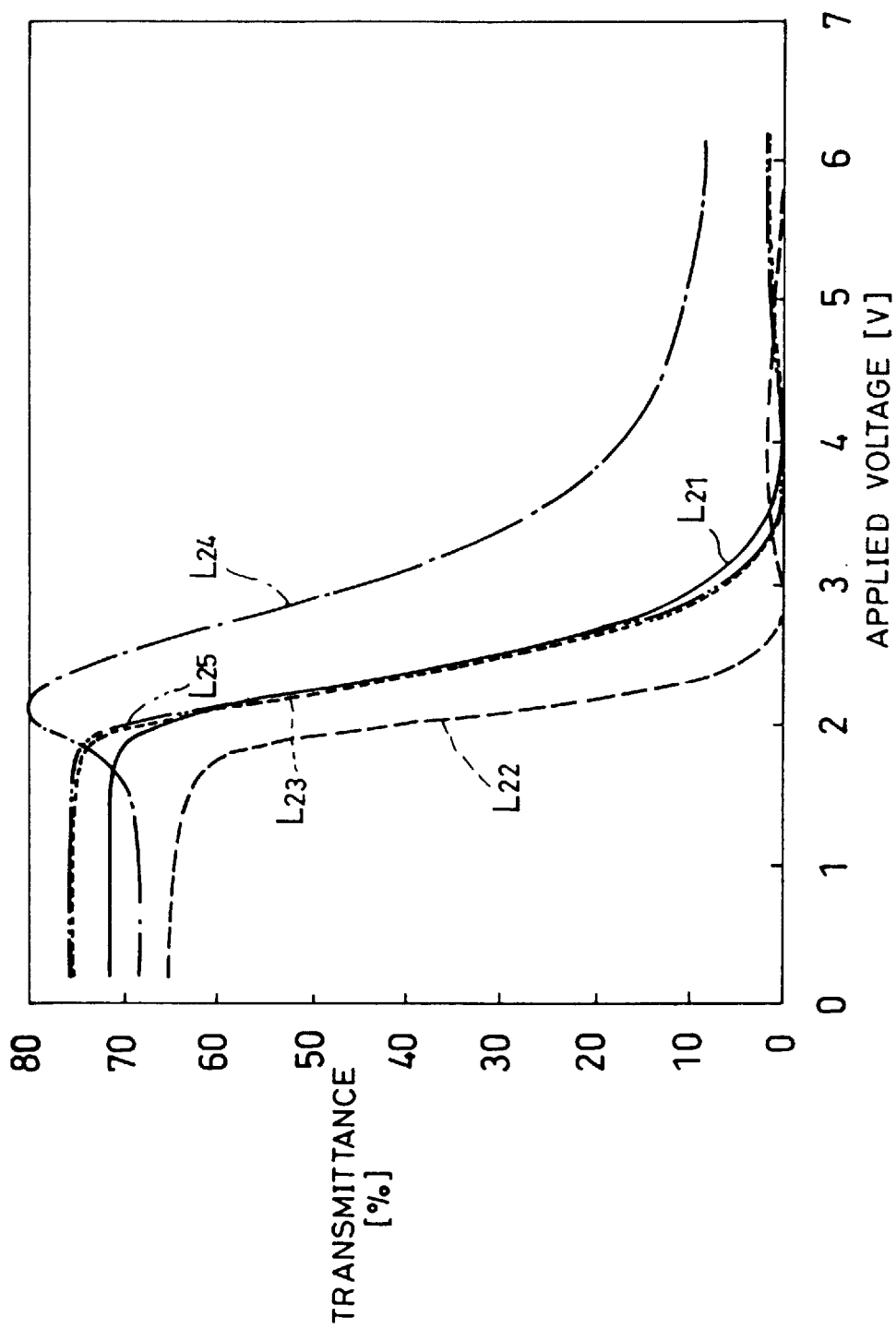
FIG. 15 is a graph that indicates the transmittance vs. applied voltage characteristic of the liquid crystal display element of FIG. 13.

With respect to the liquid crystal cell 47 having the above-mentioned arrangement, the measuring system, shown in FIG. 5, was provided in the same manner as the liquid crystal cell 17 as shown in FIG. 1, and measurements were carried out on the viewing-angle dependence. The results of the measurements are shown in FIG. 15 that is a graph indicating the transmittance vs. applied voltage characteristic. In this graph, curve $L_{21}$, indicated by a solid line, represents the characteristic in the z-direction; curve $L_{22}$, indicated by a broken line, the characteristic in the 6 o'clock direction; curve $L_{23}$, indicated by a dotted line, the characteristic in the 3 o'clock direction; curve $L_{24}$, indicated by an alternate long and short dashes line, the characteristic in the 12 o'clock direction; and curve $L_{25}$, indicated by an alternate long and two short dashes line, the characteristic in the 9 o'clock direction, respectively.

As a result, with respect to the 3 o'clock and 9 o'clock directions, a gradation-inverting phenomenon occurs because during the on-state, the transmittance increases after it has dropped to virtually 0%, as the applied voltage is increased. It was confirmed that a gradation-inverting phenomenon also occurs in the same manner in the 6 o'clock direction. Moreover, with respect to the 12 o'clock direction, it was confirmed that a sufficient reduction in the transmittance is not obtained on the on-state.

As described above, the liquid crystal layer 8 is divided into the first division-section 8a and the second division-section 8b which have different sizes and are oriented in different directions. Therefore, by combining the optical phase-difference plates 2 and 3 with the liquid crystal display element 1 having the above-mentioned liquid crystal layer 8, it is possible to obtain orientated states that are suitable for both the viewing-angle characteristic in the positive viewing-angle direction and the viewing-angle characteristic in the negative viewing-angle direction. Thus, it becomes possible to suppress degradation in contrast and a tendency of having whitish display images that occur when the viewing angle is inclined up and down directions.

Consequently, in particular, it becomes possible to display black, which is greatly affected by the degradation in contrast, with more sharpness.

Therefore, the application of the present embodiment makes it possible to dramatically improve the viewing-angle characteristics in the case when the viewing angle is inclined in the up and down directions as well as in the right and left directions, and consequently to provide a liquid crystal display which has superior visibility.

Moreover, in the liquid crystal display 1, the inclined direction of the index ellipsoid to the optical phase-difference plate 2 (or 3) is set to be opposite to the pretilt direction of liquid crystal molecules located in the vicinity of the alignment film 11 (or 14), with respect to the first division-section 8a having the largest region in the liquid crystal layer 8 for each pixel. With this arrangement, upon applying a voltage to the liquid crystal display 1, the bias in optical characteristics, resulted from the liquid crystal molecules that remain in a tilted state due to the orientation, can be suitably compensated by the optical phase-difference plate 2 or 3.

This makes it possible to suppress the gradation-inverting phenomenon that occurs when the viewing angle is inclined in the positive viewing-angle direction. As a result, it becomes possible to obtain better displayed images that are free from blurred black. Further, the degradation in contrast is suppressed even when the viewing angle is inclined in the negative viewing-angle direction. As a result, it becomes possible to obtain better displayed images that do not become whitish. In addition, it becomes possible to suppress the gradation-inverting phenomenon in the right and left directions.

Therefore, when the optical phase-difference plates 2 and 3 are incorporated into liquid crystal displays of the TN type and STN type, the viewing-angle characteristics of them can be greatly improved. Further, since the optical phase-difference plates 2 and 3 are arranged as described above, the inclined direction of the index ellipsoid in the optical phase-difference plates 2 and 3 can be readily controlled. Therefore, the optical phase-difference plates 2 and 3 having the above-mentioned characteristics can be manufactured relatively with ease.

Additionally, in the present embodiment, a liquid crystal display of the passive-matrix type is exemplified; however, the present invention is also applicable to a liquid crystal display of the active-matrix type using active switching elements such as TFTs (Thin Film Transistors).

Figure 16:
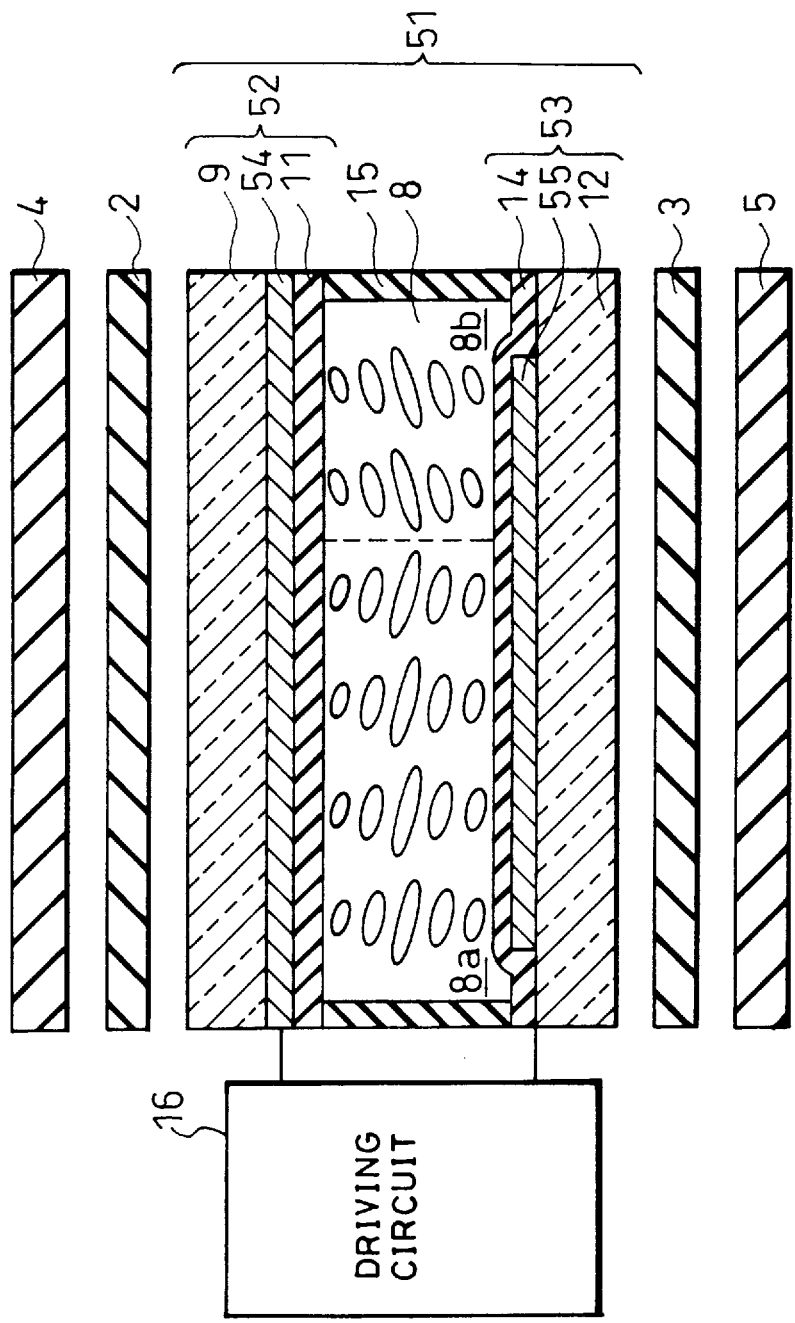
FIG. 16 is an exploded cross-sectional view that shows a construction commonly used in another liquid crystal display of the embodiment of the present invention and a liquid crystal display of another embodiment of the present invention.

As illustrated in FIG. 16, the liquid crystal display of the active-matrix type is, for example, provided with an liquid crystal display element 51, a pair of optical phase-difference plates 2 and 3, and a pair of polarization plates 4 and 5.

The liquid crystal display element 51 is constituted by opposing electrode substrates 52 and 53 and a liquid crystal layer 8 that is sandwiched in between. The electrode substrate 52 is constructed as follows: a common electrode 54, made of ITO, is formed on the surface of a glass substrate 9 on the liquid crystal layer 8 side, and an alignment film 11 is formed thereon. The electrode substrate 53 is constructed in the same manner: an pixel electrode 55, made of ITO, is formed on the surface of a glass substrate 12 on the liquid crystal layer 8 side, and an alignment film 14 is formed thereon.

Figure 17:
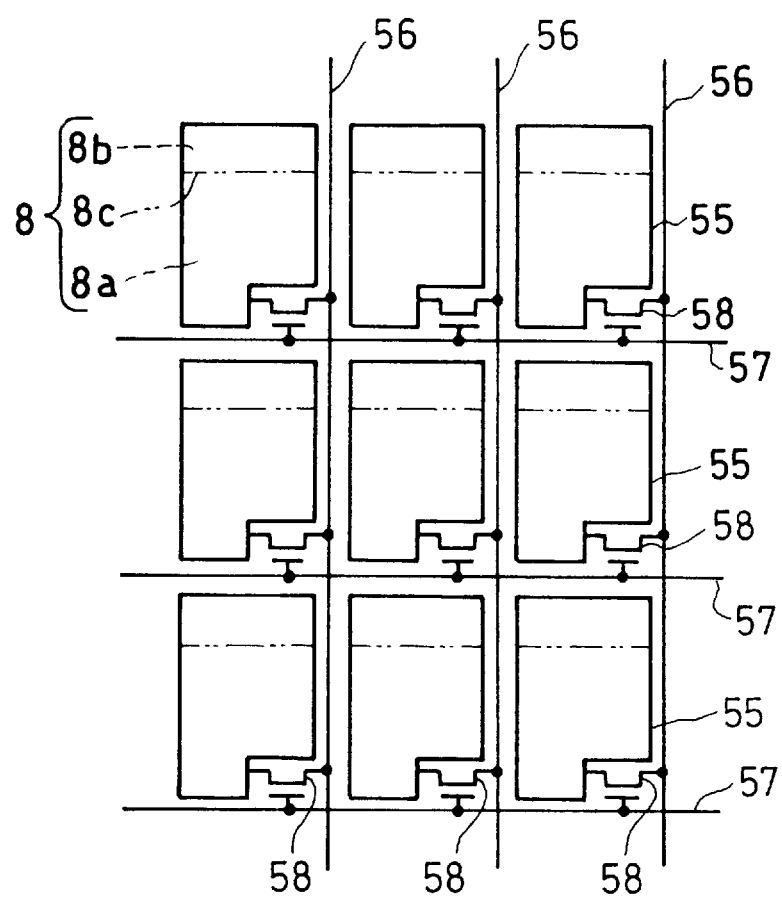
FIG. 17 is a plan view showing a construction in which a liquid crystal layer is divided in a direction parallel to scanning-electrode lines for each pixel in the liquid crystal display of FIG. 16.

For convenience of explanation, FIG. 16 shows a construction corresponding to one pixel. In the entire structure of the liquid crystal display element 51, the common electrode 54 is commonly installed in all the pixels over the entire display surface of the glass substrate 9. Further, as illustrated in FIG. 17, in the entire structure of the liquid crystal display element 51, the pixel electrodes 55 are formed on the glass substrate 12 in a matrix format. Moreover, signal-electrode lines 56, scanning-electrode lines 57 and TFTs 58 are installed on the glass substrate 12 (not shown in FIG. 16).

The signal-electrode lines 56 are electrode lines through which voltages, derived from display data, are applied, and they are placed between the pixel electrodes 55 in parallel with each other. The scanning-electrode lines 57 are electrode lines through which selection voltages for selecting pixels to be displayed for each scanning period are applied, and they are placed between the pixel electrodes 55 in parallel with each other, so as to orthogonally intersect the signal-electrode lines 56.

The TFTs 58 are placed as many as the number of the pixel electrodes 55, and designed to connect and cut off the lines between the pixel electrodes 55 and the signal-electrode lines 56. Here, the gates of the TFTs 58, which are placed along the respective scanning-electrode lines 57, are commonly connected to the corresponding scanning electrode lines 57.

In the liquid crystal display element 51 having the above-mentioned arrangement, when upon application of a selection voltage to one of the scanning-electrode lines 57, the TFTs 58 connected to the scanning-electrode line 57 are turned on, voltages, which have been applied to the signal-electrode lines 56, are applied to the pixel electrodes 55. Then, the differences between the voltages applied to the pixel electrodes 55 and the common voltage applied to the common electrode 54 are applied to the liquid crystal layer 8, thereby allowing the liquid crystal display element 51 to carry out image display.

In the present liquid crystal display, with respect to each pixel, the liquid crystal layer 8 is divided into the first division-section 8a and the second division-section 8b by each border 8c that is located in between and that is parallel to the scanning-electrode lines 57. Therefore, the present liquid crystal display also makes it possible to suppress degradation in contrast and the gradation-inverting phenomenon in the same manner as the liquid crystal display shown in FIG. 1.

[Embodiment 2]

Referring to FIGS. 16 and 18 through 22, the following description will discuss another embodiment of the present invention. Here, in the present embodiment, those components that have the same functions as the components described in Embodiment 1 are indicated by the same reference numerals and the description thereof is omitted.

Figure 18:
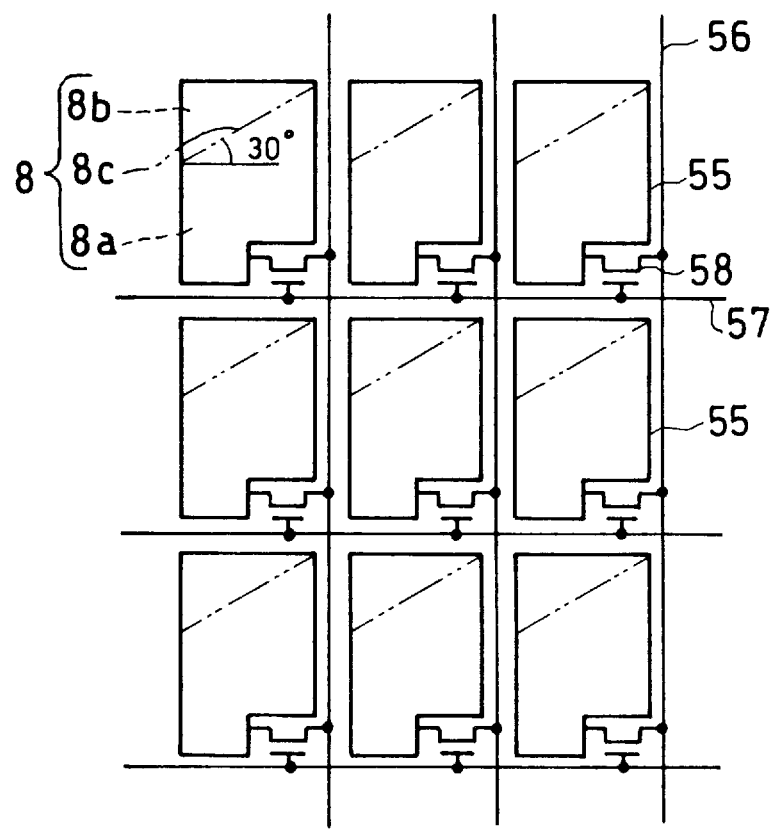
FIG. 18 is a plan view showing a construction in which a liquid crystal layer is divided in a direction diagonal to the scanning-electrode lines for each pixel in the liquid crystal display of FIG. 16.
Figure 19:
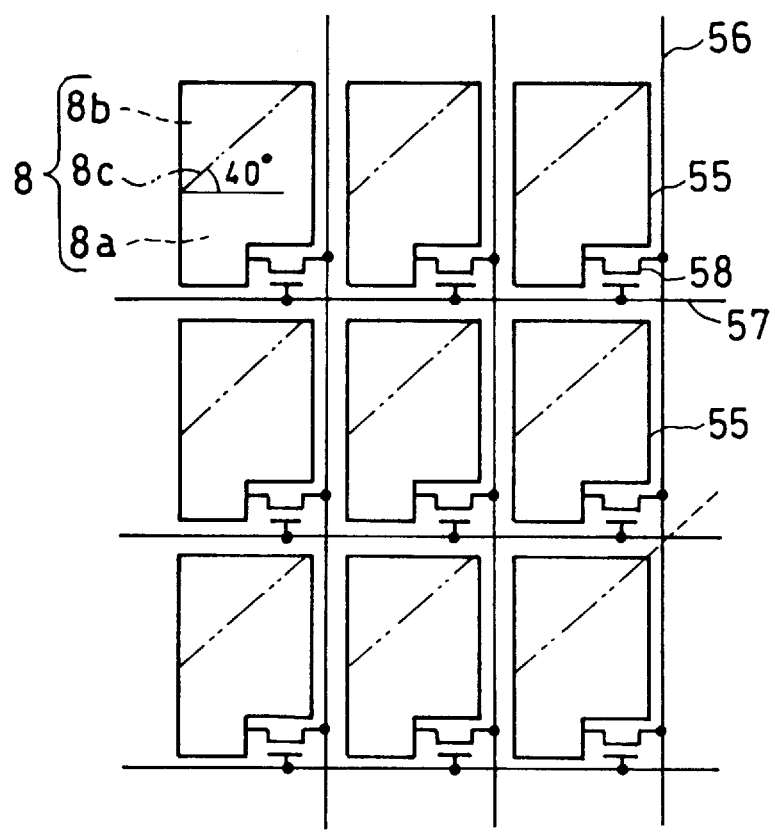
FIG. 19 is a plan view showing another construction in which a liquid crystal layer is divided in a direction diagonal to the scanning-electrode lines for each pixel in the liquid crystal display of FIG. 16.

The liquid crystal display of the present embodiment has the same construction as the liquid crystal display of Embodiment 1 shown in FIG. 16; however, the direction of the borders 8c is different from those of the liquid crystal display of Embodiment 1. For example, as shown in FIGS. 18 and 19, the borders 8c are inclined with respect to the scanning-electrode lines 57.

In order to divide the liquid crystal layer 8 along the above-mentioned inclined direction, regions having respectively different orientation states are separated by the border 8c in each of the alignment films 11 and 14. More specifically, in the alignment film 11, the regions that are oriented in the aforementioned pretilt directions $P_1$ and $P_2$ are separated by the border 8c, and in the alignment film 14, the regions that are oriented in the aforementioned pretilt directions $P_3$ and $P_4$ are separated by the border 8c.

As described above, since the borders 8c are inclined with respect to the scanning-electrode lines 57, it is possible to stabilize the borders 8c. In the present embodiment, in order to stabilize the borders 8c, the characteristic in which liquid crystal molecules in the vicinity of the electrode lines (the signal-electrode lines 56 or scanning-electrode lines 57) tend to be aligned in the direction along the lines of electric force exerted from the electrode lines is utilized. In other words, as described earlier, since the borders, which are parallel to the electrode lines, are inclined with respect to the electrode lines due to the above-mentioned characteristic, it is possible to suppress the shift of the borders 8c, when the liquid crystal layer 8 is preliminarily divided along the direction in which they are to be inclined with respect to the electrode lines.

Consequently, since the liquid crystal layer 8 is divided in a stable manner, it is possible to suppress the occurrence of display unevenness. Therefore, since the liquid crystal layer 8 is divided so as to have the same ratio as designed in the liquid crystal display of Embodiment 1, it becomes possible to improve the display quality easily.

In the example shown in FIG. 18, the border 8c is inclined by 30° with respect to the scanning-signal lines 57. The inclined angle of the border 8c is preferably selected from within the range of 10° to 80°. The border 8c is kept stable when it is inclined with an inclined angle within this range. This makes it possible to further suppress the occurrence of display unevenness, and consequently to further improve the display quality. In particular, when the inclined angle is set at 45°, the border 8c becomes most stable. Moreover, when the inclined angle is out of the range of 10° to 80°, the border 8c is not kept stable.

In the case when each pixel has a rectangular shape, since the border 8c becomes longer as the inclined angle becomes greater, the stability of the border 8c tends to decrease. Therefore, in this case, it is preferable to select the inclined angle within the range of 10° to 45°. Moreover, in order to enhance the stability of the border 8c, it is optimal to set the inclined angle within the range of 20° to 50°, which is in the vicinity of 45°.

Figure 20:
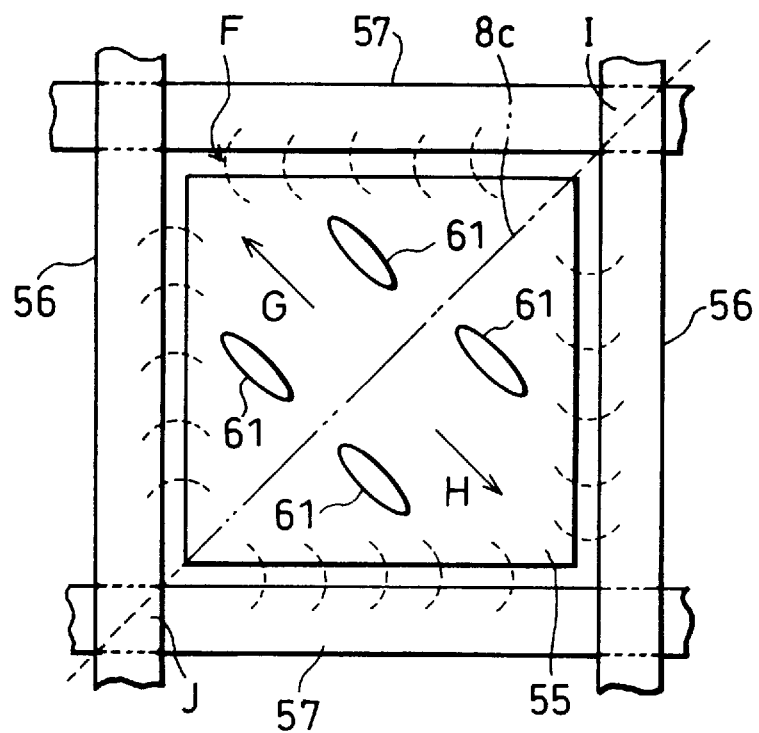
FIG. 20 is an explanatory drawing that shows a state in which liquid crystal molecules are affected by lines of electric force from the signal-electrode lines and scanning-electrode lines in the liquid crystal display of FIG. 16.

In the example shown in FIG. 19, the border 8c is inclined by 40° with respect to the scanning-electrode lines 57. In addition, the border 8c is inclined so that, if extended, it comes to cross the intersection of the signal-electrode line 56 and the scanning-electrode line 57. With this arrangement, the border 8c is kept more stable. The reasons for this are described as follows:

As illustrated in FIG. 20, liquid crystal molecules 61, located in the vicinity of the alignment film 14, are inclined by 45° with respect to both the signal-electrode lines 56 and the scanning-electrode lines 57, and affected by lines F of electric force that are exerted by the two signal-electrode lines 56 and the two scanning-electrode lines 57, which surround the corresponding pixel (the pixel electrode 55). More specifically, the liquid crystal molecules 61 are subjected to a force in a direction indicated by arrow G from one pair of the signal-electrode line 56 and scanning-electrode line 57 that intersect each other, and also subjected to a force in a direction indicated by arrow H from the other pair of the signal-electrode line 56 and scanning-electrode line 57 that intersect each other.

In this state, the force exerted by the line F of electric force from the signal-electrode line 56 and the scanning-electrode line 57 is uniformly applied to the liquid crystal molecules 61. For this reason, in the case of pixels having a squire shape, the border 8c becomes most stable when it is placed so as to cross both of the two intersections I and J of the two pairs of the signal-electrode lines 56 and the scanning-electrode lines 57. Further, in the case of pixels having a rectangular shape, the border 8c becomes most stable when it is placed so as to cross either of the above-mentioned two intersections I and J. Thus, since the stability of the border 8c is maintained in an extremely high state, it is possible to virtually eliminate the occurrence of display unevenness. Consequently, it becomes possible to achieve high display quality.

Additionally, in either of the above-mentioned cases, the inclined angle is determined depending on the division ratio (in the range of 6:4 to 19:1) of the first and second division sections 8a and 8b.

As described above, in the present liquid crystal display, the liquid crystal layer 8 is divided by the border 8c that is located in between and that is inclined with respect to the scanning-electrode lines 57. With this arrangement, since the orientated states of the first and second division-sections 8a and 8b become stable, it is possible to obtain uniform picture quality without display unevenness.

Next, the following description will discuss a modified example of the present embodiment.

Figure 21:
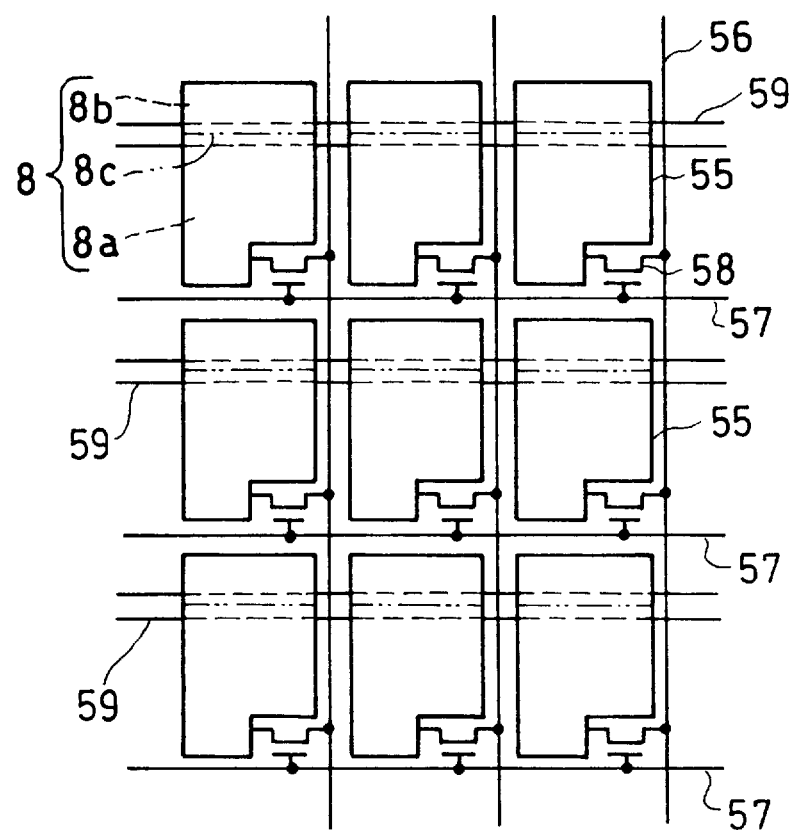
FIG. 21 is a plan view showing another construction in which a liquid crystal layer is divided in a direction parallel to scanning-electrode lines for each pixel in the liquid crystal display of FIG. 16.

As illustrated in FIG. 21, the liquid crystal display of the modified example is provided with storage-capacitor lines 59 that are parallel to the scanning-electrode lines 57. Further, the borders 8c are placed on the storage-capacitor lines 59 in parallel with the respective scanning-electrode lines 57.

Figure 22A:
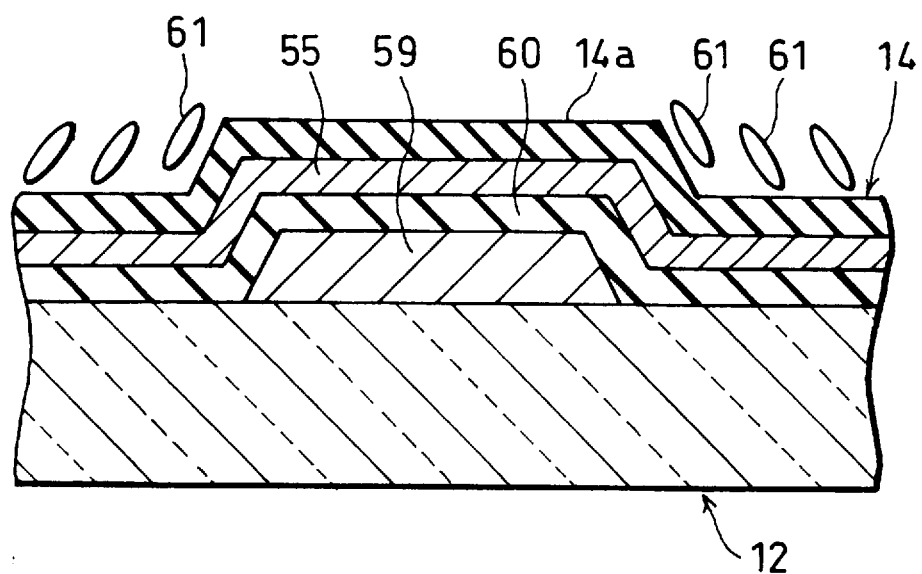
FIGS. 22(a) and 22(b) are cross-sectional views that show parts of cross-sectional structures taken along signal-electrode lines in the construction of FIG. 21.

As illustrated in FIG. 22(a), the storage-capacitor lines 59 are formed on a glass substrate 12, and each of them has two tapered side faces that tilt with respect to the surface of the glass substrate 12. The storage-capacitor lines 59 are electrodes that are insulated from the pixel electrodes 55 by an insulating film 60. A storage capacitor is formed by the storage-capacitor lines 59, the pixel electrodes 55 and the insulating film 60. The storage capacitor is allowed to hold a charge even when the TFTs 58 are turned off so that no voltage is applied to the pixel electrodes 55 from the signal-electrode lines 56.

The alignment film 14 is deposited on the pixel electrodes 55. On the alignment film 14, raised sections 14a, each of which has a height corresponding to the thickness of the storage-capacitor line 59, are formed. Each of the raised sections 14a is designed to have a height of 1000 Å and a width of 40 μm of its upper surface. The height and the width of its upper surface are not necessarily limited by the above-mentioned values; it is preferable to set them in the respective ranges of 500 to 5000 Å and 5 to 50 μm. Further, the raised section 14a has tapered faces on both sides that tilt with the same angle as the two side faces of the storage-capacitor line 59. The angle is virtually coincident with the direction in which liquid crystal molecules 61 are aligned by an aligning force exerted by the alignment film 14.

In the arrangement as described above wherein the border 8c is placed on the raised section 14a, although the liquid crystal molecules 61 in the vicinity of the border 8c tend to line up in the direction of lines of electric force from the signal-electrode lines 56 and the scanning-electrode lines 57, the movements are interfered by the tapered faces of the raised section 14a. Consequently, the liquid crystal molecules 61 are hardly affected by the lines of electric force so that hardly any disturbance occurs in their alignment; therefore, they are aligned along the tapered faces of the raised section 14a in a stable manner.

As described above, since the disturbance in alignment of the liquid crystal molecules 61 is suppressed to a great degree, the border 8c that is placed on the raised section 14a becomes stable without any movements. In other words, this allows the liquid crystal layer 8 to be divided in a stable manner. Therefore, the application of the above-mentioned arrangement makes it possible to divide the liquid crystal layer 8 with the virtually same ratio that has been designed in the liquid crystal display of Embodiment 1. Consequently, it becomes possible to suppress the occurrence of display unevenness, and also to easily improve the display quality.

Figure 22B:
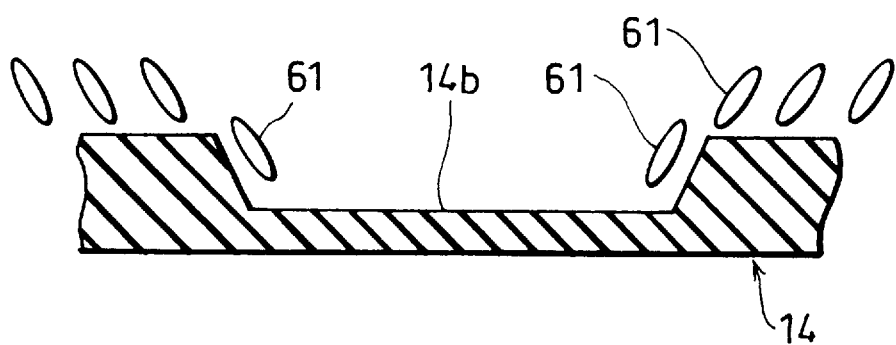

Moreover, as illustrated in FIG. 22(b), each border 8c may be placed not on the storage-capacitor line 59, but on each recessed section 14b that is formed in the alignment film 14. The recessed section 14b has tapered faces on both sides thereof that tilt with the same angle as the side faces of the storage-capacitor line 59.

In this arrangement also, since the liquid crystal molecules 61 in the vicinity of the border 8c are aligned in a stable manner along the tapered faces of the recessed section 14b, the border 8c is also stabilized.

Further, when the height of the raised section 14a and the depth of the recessed section 14b are respectively set in the range of 500 to 5000 Å, and when the width of the upper face of the raised section 14a and that of the bottom face of the recessed section 14b are respectively set in the range of 5 to 50 μm, the stability of the border is further improved. Therefore, it becomes possible to further suppress the occurrence of display unevenness, and also to further improve the display quality.

As described above, the liquid crystal display of the present embodiment makes it possible to divide the liquid crystal layer 8 with virtually the same division ratio as has been designed by stabilizing the border 8c. Thus, it is possible to positively ensure the suppressing effects on degradation in contrast and the gradation-inverting phenomenon that have been achieved by the liquid crystal display of Embodiment 1.

[Embodiment 3]

Figure 23:
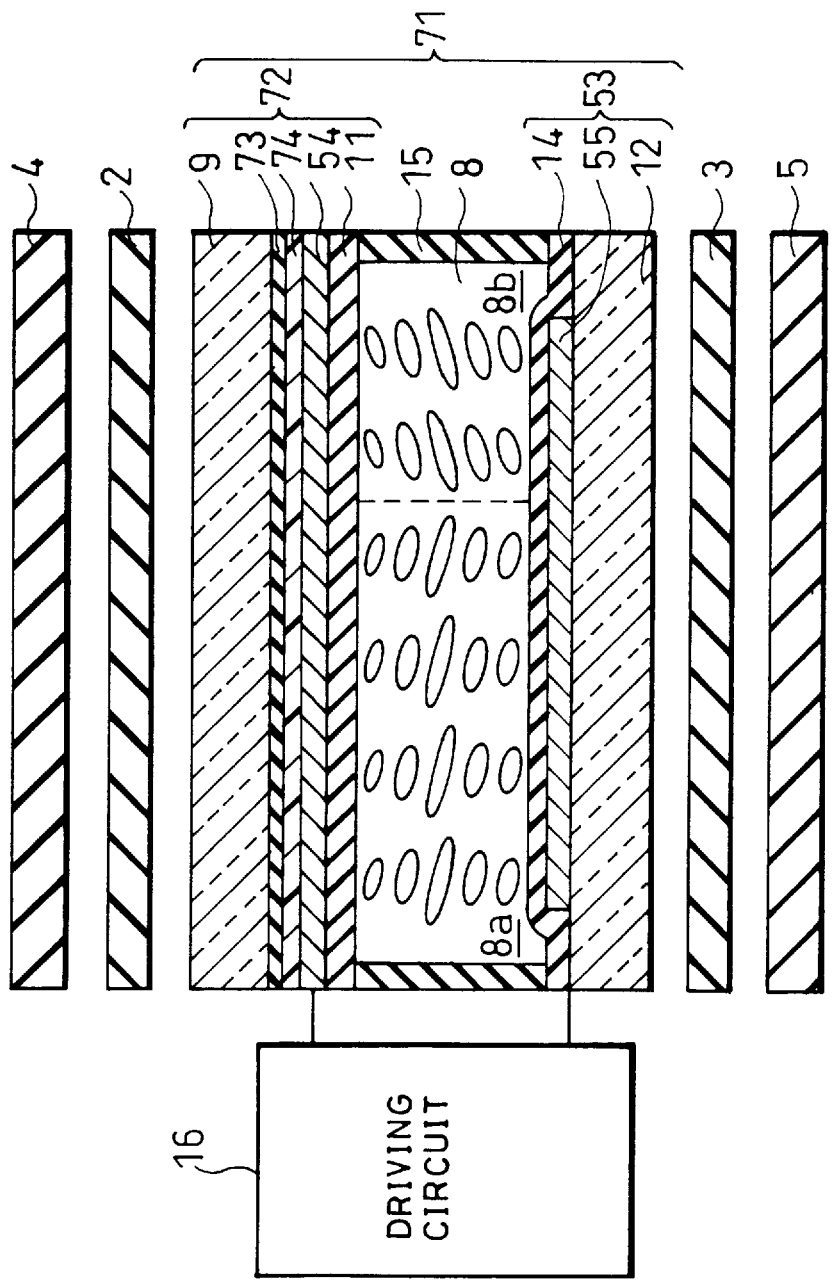
FIG. 23 is an exploded cross-sectional view that shows a construction of a liquid crystal display of another embodiment of the present invention.
Figure 24:
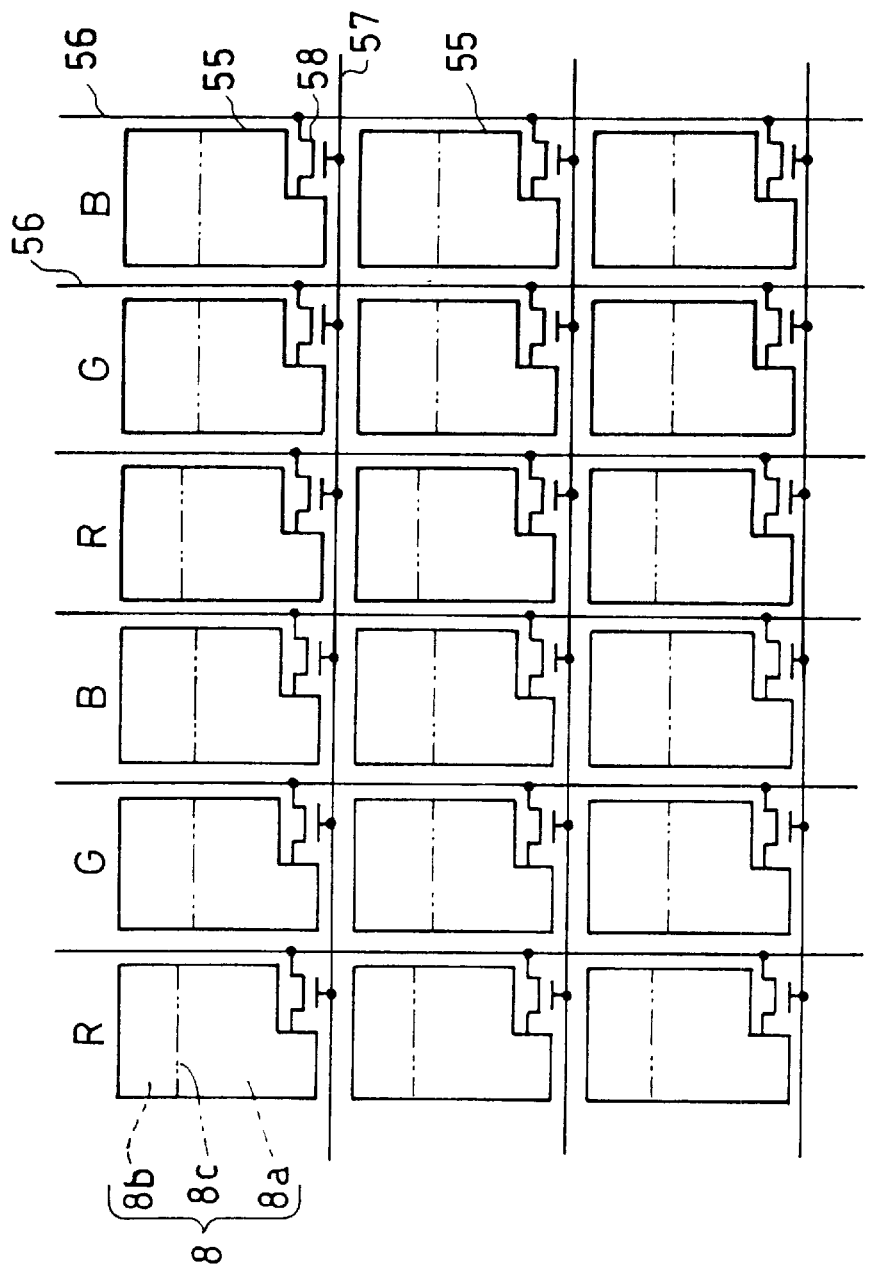
FIG. 24 is a plan view showing a construction in which a liquid crystal layer is divided in a direction parallel to the scanning-electrode lines for each pixel in the liquid crystal display of FIG. 23.
Figure 25:
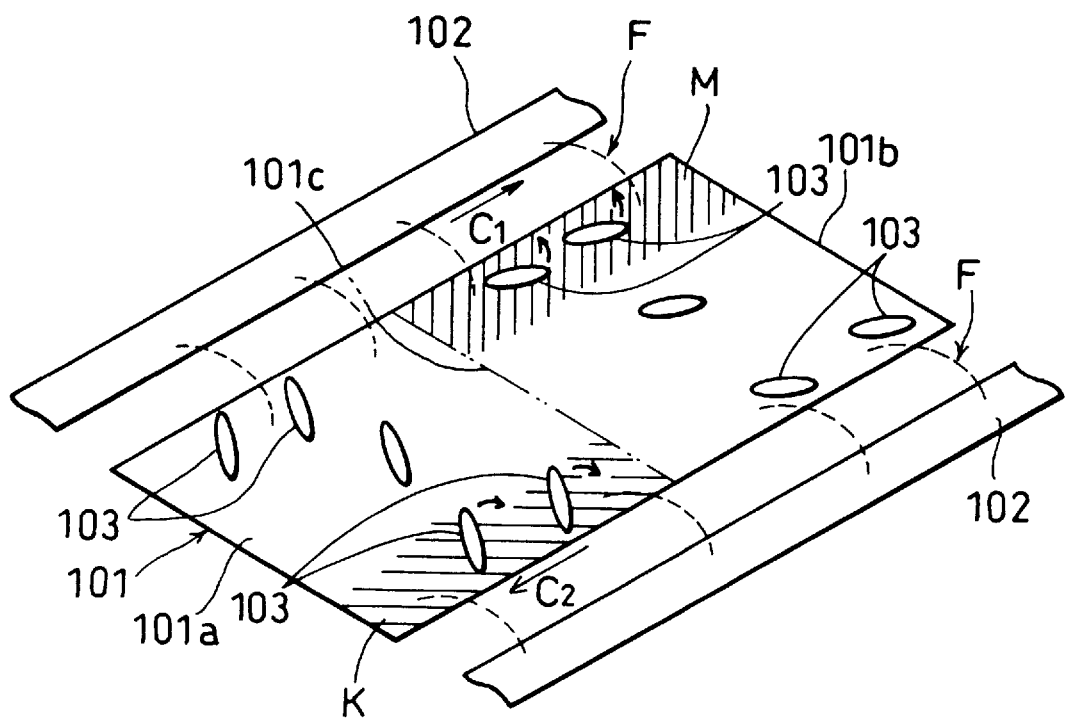
FIG. 25 is an explanatory drawing that shows a state in which a liquid crystal layer, which is divided by a conventional pixel-division method, is affected by lines of electric force from the electrode lines.

Referring to FIGS. 23 and 24, the following description will discuss still another embodiment of the present invention. Here, in the present embodiment, those components that have the same functions as the components described in Embodiment 1 are indicated by the same reference numerals and the description thereof is omitted.

As illustrated in FIG. 23, the liquid crystal display of the present embodiment is provided with a liquid crystal display element 71 and a pair of optical phase-difference plates 2 and 3 and a pair of polarization plates 4 and 5. Here, for convenience of explanation, FIG. 23 shows a construction corresponding to one pixel.

The liquid crystal display element 71 is constituted by opposing electrode substrates 72 and 53 and a liquid crystal layer 8 that is sandwiched in between. The electrode substrate 72 is constructed as follows: A color filter 73 and a protective film 74 are deposited on the surface of a glass substrate 9 on the liquid crystal layer 8 side, and a common electrode 54 and an alignment film 11 are formed thereon. As shown in FIG. 24, the color filter 73 is arranged so that its red (R), green (G) and blue (B) portions fit to respective pixels in each column that are placed along the signal-electrode lines 56.

In the liquid crystal layer 8, the borders 8c are placed at respective positions corresponding to the red, green and blue portions of the color filter 73. More specifically, the second division-section 8b in each of the pixels corresponding to green and blue is designed to be larger than the second division-section 8b in the pixel corresponding to red. Since the second division-section 8b is related to the viewing angle in the upward direction, when the display screen of the liquid crystal display having such an arrangement is viewed from downward, the displayed color appears to be bluish green. Therefore, in the case when the display screen of the liquid crystal display of Embodiment 1, when viewed from downward, appears to be reddish, the reddish display is alleviated by the above-mentioned arrangement of the border 8c.

In the above-mentioned arrangement, the larger the second division-sections 8b related to blue and green, the greater the degree at which the displayed color, viewed from downward, becomes bluish green. Therefore, any degree of coloring may be alleviated by optimizing the division ratio of the liquid crystal layer 8 depending on the degree of coloring.

As described above, in the liquid crystal display of the present embodiment, it is possible to alleviate coloring that is dependent on the viewing angle by determining the positions of the borders 8c in relation to the red, green and blue portions of the color filter 73, that is, the ratios of sizes of the first division-section 8a and the second division-section 8b.

When a liquid crystal display without the color filter 73 is viewed from downward, the second division-section 8b, related to the viewing angle in the upward direction, appears to be black, while the first division-section 8a, related to the viewing angle in the downward direction, appears to be transparent to light. Therefore, in the liquid crystal display with the color filter 73, if the above-mentioned ratios are set all the same with respect to the respective colors of the color filter 73, light that has passed through the liquid crystal display element 71 appears to be white.

In contrast, in the arrangement of the present embodiment, since the ratios are determined in relation to the respective colors of the color filter 73, light rays which pass through the respective colors of the liquid crystal element 71 can be colored as desired. Therefore, if the above-mentioned ratio is set so that light rays which have passed through the first division-section 8a and the second division-section 8b have additive complementary colors to each other, the coloring of the light rays that have passed through the liquid crystal display element 71 can be virtually eliminated.

As described above, the liquid crystal display of the present embodiment makes it possible to easily control the coloring of displayed images. Therefore, the application of the above-mentioned arrangement makes it possible to enhance display quality by improving the coloring that is dependent on the viewing angle upon dividing the liquid crystal layer 8 into the ratio that has been designed in the liquid crystal display of Embodiment 1.

Additionally, in the present embodiment, the explanation has been given by exemplifying a case in which red coloring is alleviated; however, coloring of any other color may be alleviated in the same method.

Moreover, in Embodiment 2 and the present embodiment, a liquid crystal display of the active-matrix type using active switching elements such as TFTs is exemplified; however, the invention of these embodiments is also applicable to a liquid crystal display of the passive-matrix type.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display comprising
  a liquid crystal display element having a pair of light-transmitting substrates that have opposing surfaces, each of the opposing surfaces having a transparent electrode and an alignment film respectively formed thereon, and a liquid crystal layer that is interpolated between the substrates, wherein the transparent electrodes are arranged on the opposing surfaces so as to establish a plurality of display pixels;
  a pair of polarizers that are placed on both sides of the liquid crystal display element;
  an optical phase-difference plate that is interpolated at least in either of gaps between the liquid crystal display element and the pair of the polarizers;
  wherein the liquid crystal layer in each pixel is oriented by the alignment film in different directions so that it is divided into divisions of the liquid crystal layer having respectively different sizes; and
  wherein the optical phase-difference plate is placed so that an index ellipsoid, which is represented by principal refractive indexes in three directions of the optical phase-difference plate and which identifies anisotropy of the principal refractive indexes of the optical phase-difference plate, is inclined with respect to a surface of the optical phase-difference plate, and so that upon application of a voltage to the transparent electrodes, a tilted direction of liquid crystal molecules in a vicinity of a surface of the corresponding alignment film is opposite to the inclined direction of the index ellipsoid, with respect to the largest division of the liquid crystal layer in the pixel.

2. The liquid crystal display as defined in claim 1, wherein: the divisions of the liquid crystal layer include a first division of liquid crystal layer and a second division of liquid crystal layer that is smaller than the first division, and a ratio of sizes of the first division of liquid crystal layer and the second division of liquid crystal layer is set in a range of 6:4 to 19:1.

3. The liquid crystal display as defined in claim 2, wherein the first and second divisions of liquid crystal layer have orientation directions opposite to each other.

4. The liquid crystal display as defined in claim 2, wherein: the transparent electrode on one of the opposing surfaces includes signal-electrode lines for applying display-use signal voltages to the pixels and the transparent electrode on the other opposing surface includes scanning-electrode lines for selecting the application of the signal voltages to the pixels for each scanning period, and the first division of liquid crystal layer and the second division of liquid crystal layer are oriented so that a border between the two divisions is inclined with respect to the scanning-electrode lines.

5. The liquid crystal display as defined in claim 4, wherein the border and the scanning-electrode lines make an angle in a range of 10° to 80°.

6. The liquid crystal display as defined in claim 5, wherein the border and the scanning-electrode lines make an angle in a range of 20° to 50°.

7. The liquid crystal display as defined in claim 6, wherein the border crosses an intersection of each of the signal-electrode lines and each of the scanning-electrode lines.

8. The liquid crystal display as defined in claim 2, wherein: the alignment film on one of the opposing surfaces comprises raised sections, each having tapered faces on both side faces thereof that are inclined with respect to the opposing surface of the corresponding light-transmitting substrate, and a border between the first division of liquid crystal layer and the second division of liquid crystal layer is placed on each of the raised sections.

9. The liquid crystal display as defined in claim 8, wherein: a height of the raised section is set in a range of 500 to 5000 Å and a width of an upper face of the raised section is set in a range of 5 to 50 μm.

10. The liquid crystal display as defined in claim 9, wherein said each of the raised sections is formed on each of storage-capacitor electrodes that are formed on the corresponding light-transmitting substrate so as to form a storage capacitor.

11. The liquid crystal display as defined in claim 2, wherein: the alignment film on one of the opposing surfaces comprises recessed sections, each having tapered faces on both side faces thereof that are inclined with respect to the opposing surface of the corresponding light-transmitting substrate, and a border between the first division of liquid crystal layer and the second division of liquid crystal layer is placed on each of the recessed sections.

12. The liquid crystal display as defined in claim 11, wherein: a depth of the recessed section is set in a range of 500 to 5000 < and a width of a bottom face of the recessed section is set in a range of 5 to 50 μm.

13. The liquid crystal display as defined in claim 2, wherein: a color filter is formed on either of the pair of the light-transmitting substrates, and the ratio of sizes of the first division of liquid crystal layer and the second division of liquid crystal layer is determined in accordance with respective colors of the color filter.

14. The liquid crystal display as defined in claim 13, wherein the ratio is set so that light rays which have respectively passed through the first division of liquid crystal layer and the second division of liquid crystal layer have additive complementary colors to each other.

15. The liquid crystal display as defined in claim 2, wherein the ratio of sizes of the first division of liquid crystal layer and the second division of liquid crystal layer is set in a range of 7:3 to 9:1.

16. The liquid crystal display as defined in claim 15, wherein the first and second divisions of liquid crystal layer have orientation directions opposite to each other.

17. The liquid crystal display as defined in claim 15, wherein: the transparent electrode on one of the opposing surfaces includes signal-electrode lines for applying display-use signal voltages to the pixels and the transparent electrode on the other opposing surface includes scanning-electrode lines for selecting the application of the signal voltages to the pixels for each scanning period, and the first division of liquid crystal layer and the second division of liquid crystal layer are oriented so that a border between the two divisions is inclined with respect to the scanning-electrode lines.

18. The liquid crystal display as defined in claim 17, wherein the border and the scanning-electrode lines make an angle in a range of 10° to 80°.

19. The liquid crystal display as defined in claim 18, wherein the border and the scanning-electrode lines make an angle in a range of 20° to 50°.

20. The liquid crystal display as defined in claim 19, wherein the border crosses an intersection of each of the signal-electrode lines and each of the scanning-electrode lines.

21. The liquid crystal display as defined in claim 15, wherein: the alignment film on one of the opposing surfaces comprises raised sections, each having tapered faces on both side faces thereof that are inclined with respect to the opposing surface of the corresponding light-transmitting substrate, and a border between the first division of liquid crystal layer and the second division of liquid crystal layer is placed on each of the raised sections.

22. The liquid crystal display as defined in claim 21, wherein: a height of the raised section is set in a range of 500 to 5000 Å and a width of an upper face of the raised section is set in a range of 5 to 50 μm.

23. The liquid crystal display as defined in claim 22, wherein said each of the raised sections is formed on each of storage-capacitor electrodes that are formed on the corresponding light-transmitting substrate so as to form a storage capacitor.

24. The liquid crystal display as defined in claim 15, wherein: the alignment film on one of the opposing surfaces comprises recessed sections, each having tapered faces on-both side faces thereof that are inclined with respect to the opposing surface of the corresponding light-transmitting substrate, and a border between the first division of liquid crystal layer and the second division of liquid crystal layer is placed on each of the recessed sections.

25. The liquid crystal display as defined in claim 24, wherein: a depth of the recessed section is set in a range of 500 to 5000 Å and a width of A bottom face of the recessed section is set in a range of 5 to 50 μm.

26. The liquid crystal display as defined in claim 15, wherein: a color filter is formed on either of the pair of the light-transmitting substrates, and the ratio of sizes of the first division of liquid crystal layer and the second division of liquid crystal layer is determined in accordance with respective colors of the color filter.

27. The liquid crystal display as defined in claim 26, wherein the ratio is set so that light rays which have passed through the first division of liquid crystal layer and the second division of liquid crystal layer have additive complementary colors to each other.

28. The liquid crystal display as defined in claim 1, wherein the optical phase-difference plate is formed by providing a support base made of a transparent organic polymeric material, and oblique-orienting discotheque liquid crystal onto the support base so as to be crosslinked.

29. The liquid crystal display as defined in claim 1, wherein the optical phase-difference plate is formed by providing a support base made of a transparent organic polymeric material, and hybrid-orienting discotheque liquid crystal onto the support base so as to be crosslinked.

* * * * *